United States Patent
Farag et al.

(10) Patent No.: US 11,729,736 B2
(45) Date of Patent: Aug. 15, 2023

(54) TIME ADJUSTMENT DURING HANDOVER

(71) Applicant: Samsung Electronics Co., Ltd., Suwon-si (KR)

(72) Inventors: Emad N. Farag, Flanders, NJ (US); Hongbo Si, Plano, TX (US); Nishith D. Tripathi, Parker, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/443,932

(22) Filed: Jul. 28, 2021

(65) Prior Publication Data

US 2022/0046574 A1    Feb. 10, 2022

Related U.S. Application Data

(60) Provisional application No. 63/062,167, filed on Aug. 6, 2020.

(51) Int. Cl.
*H04W 4/00* (2018.01)
*H04W 56/00* (2009.01)
(Continued)

(52) U.S. Cl.
CPC ..... *H04W 56/0045* (2013.01); *H04L 27/2607* (2013.01); *H04W 36/0072* (2013.01); *H04W 74/0841* (2013.01); *H04W 84/06* (2013.01)

(58) Field of Classification Search
CPC ................................................. H04W 56/0045
See application file for complete search history.

(56) References Cited

U.S. PATENT DOCUMENTS 11,503,515 B2 * 11/2022 Chien ................. H04W 56/001
2007/0149206 A1 * 6/2007 Wang ................. H04W 36/0085
                                                                  455/450
(Continued)

FOREIGN PATENT DOCUMENTS

WO    2019195457 A1    10/2019
WO    2020065469 A1     4/2020
(Continued)

OTHER PUBLICATIONS

International Search Report and Written Opinion of the International Searching Authority in connection with International Application No. PCT/KR2021/010167 dated Nov. 3, 2021, 8 pages.
(Continued)

*Primary Examiner* — Chi H Pham
*Assistant Examiner* — Elisabeth Benoit Magloire

(57) ABSTRACT

Methods and apparatuses for time adjustment during handover in non-terrestrial networks. A method of operating a user equipment (UE) includes receiving configuration information for a first and a second RS and receiving the first RS from a first base station (BS) and the second RS from a second BS. The method also includes measuring a time of arrival of the second RS relative to a time of arrival of the first RS, determining a differential propagation delay between the first RS and the second RS based on the times of arrival. The method further includes determining a transmission time for an uplink (UL) UE-dedicated channel to the
(Continued)

second BS based on the differential propagation delay and transmitting the UL UE-dedicated channel to the second BS based on the determined time.

12 Claims, 17 Drawing Sheets

(51) Int. Cl.
*H04W 74/08* (2009.01)
*H04L 27/26* (2006.01)
*H04W 36/00* (2009.01)
*H04W 84/06* (2009.01)

(56) References Cited

U.S. PATENT DOCUMENTS

| | | | |
|---|---|---|---|
| 2018/0098321 A1* | 4/2018 | Chae | H04W 72/0446 |
| 2018/0132199 A1* | 5/2018 | Zhang | H04W 56/0065 |
| 2019/0191403 A1* | 6/2019 | Goel | H04L 27/2695 |
| 2020/0120009 A1* | 4/2020 | Im | H04W 76/15 |
| 2020/0267609 A1* | 8/2020 | Ly | H04W 36/0072 |
| 2020/0275492 A1* | 8/2020 | Lei | H04L 5/0053 |
| 2021/0029658 A1 | 1/2021 | Mahalingam et al. | |
| 2022/0191898 A1* | 6/2022 | Sergeev | H04W 74/0833 |
| 2022/0240208 A1* | 7/2022 | Chien | H04W 56/0045 |
| 2022/0264500 A1* | 8/2022 | Wiacek | G01S 5/0205 |

FOREIGN PATENT DOCUMENTS

| | | | |
|---|---|---|---|
| WO | 2020092561 A1 | 5/2020 | |
| WO | 2020146506 A2 | 7/2020 | |

OTHER PUBLICATIONS

Nokia et al., "Doppler Compensation, Uplink Timing Advance and Random Access in NTN", R1-1913017, 3GPP TSG RAN WG1 #99, Reno, USA, Nov. 18-22, 2019, 29 pages.

"3rd Generation Partnership Project; Technical Specification Group Radio Access Network; NR; Physical channels and modulation (Release 16)", 3GPP TS 38.211 V16 6.0, Jun. 2021, 134 pages.

"3rd Generation Partnership Project; Technical Specification Group Radio Access Network; NR; Multiplexing and channel coding (Release 16)", 3GPP TS 38.212 V16.6 0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.6.0, Jun. 2021, 577 pages.

* cited by examiner

TIME ADJUSTMENT DURING HANDOVER

CROSS-REFERENCE TO RELATED APPLICATIONS AND CLAIM OF PRIORITY

The present application claims priority to U.S. Provisional Patent Application No. 63/062,167, filed on Aug. 6, 2020. The content of the above-identified patent document is incorporated herein by reference.

TECHNICAL FIELD

The present disclosure relates generally to wireless communication systems and, more specifically, the present disclosure relates to time adjustment during handover in non-terrestrial networks.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to time adjustment during handover in non-terrestrial networks.

In one embodiment, a user equipment (UE) is provided. The UE includes a transceiver configured to receive configuration information for a first and a second reference signal (RS) and receive the first RS from a first base station (BS) and the second RS from a second BS. The UE also includes a processor operably connected to the transceiver. The processor is configured to measure a time of arrival of the second RS relative to a time of arrival of the first RS, determine a differential propagation delay between the first RS and the second RS based on the times of arrival, and determine a transmission time for an uplink (UL) UE-dedicated channel to the second BS based on the differential propagation delay. The transceiver is further configured to transmit the UL UE-dedicated channel to the second BS based on the determined time.

In another embodiment, a BS is provided. The BS includes a transceiver configured to transmit a RS. The BS also includes a processor operably connected to the transceiver. The processor is configured to identify an indication from a neighboring BS about a UE that would start communicating with the BS before completion of a random access procedure. The transceiver is further configured to transmit a downlink (DL) UE-dedicated channel to the UE and receive an UL UE-dedicated channel from the UE.

In yet another embodiment, a method of operating a UE is provided. The method includes receiving configuration information for a first and a second RS and receiving the first RS from a first BS and the second RS from a second BS. The method also includes measuring a time of arrival of the second RS relative to a time of arrival of the first RS, determining a differential propagation delay between the first RS and the second RS based on the times of arrival. The method further includes determining a transmission time for an UL UE-dedicated channel to the second BS, based on the differential propagation delay and transmitting the UL UE-dedicated channel to the second BS based on the determined time.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 16C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.6.0, "Physical channels and modulation"; 3GPP TS 38.212 v16.6.0, "NR; Multiplexing and Channel coding"; 3GPP TS 38.213 v16.6.0, "NR; Physical Layer Procedures for Control"; 3GPP TS 38.214: v.16.6.0, "Physical layer procedures for data"; 3GPP TS 38.321 v16.5.0, "Medium Access Control (MAC) protocol specification"; 3GPP TS 38.331 v.16.5.0. "Radio Resource Control (RRC) protocol specification"; and 3GPP TS 36.213 v16.6.0, "Evolved Universal Terrestrial Radio Access (E-UTRA); Physical layer procedures."

Figure 1:
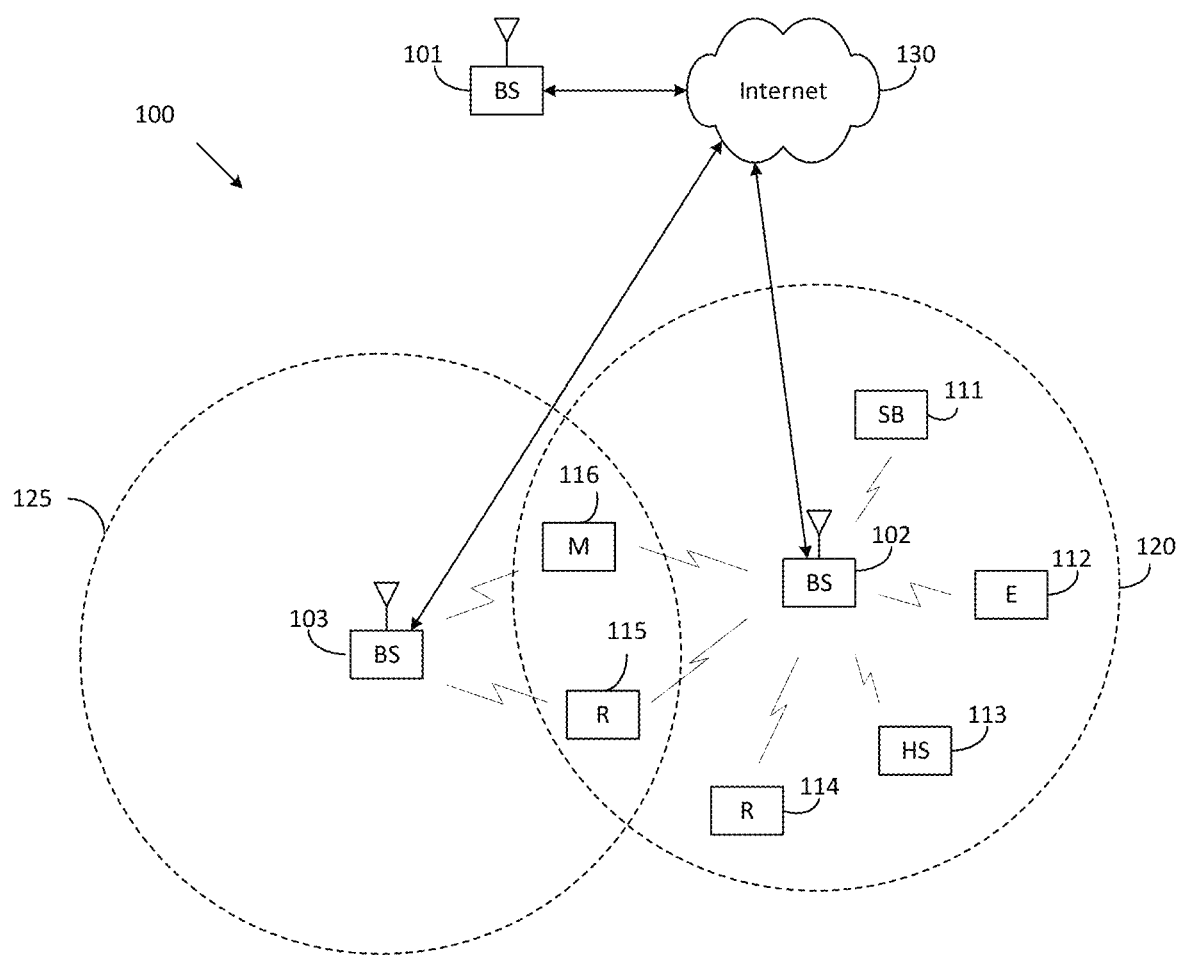
FIG. 1 illustrates an example wireless network according to embodiments of the present disclosure.
Figure 2:
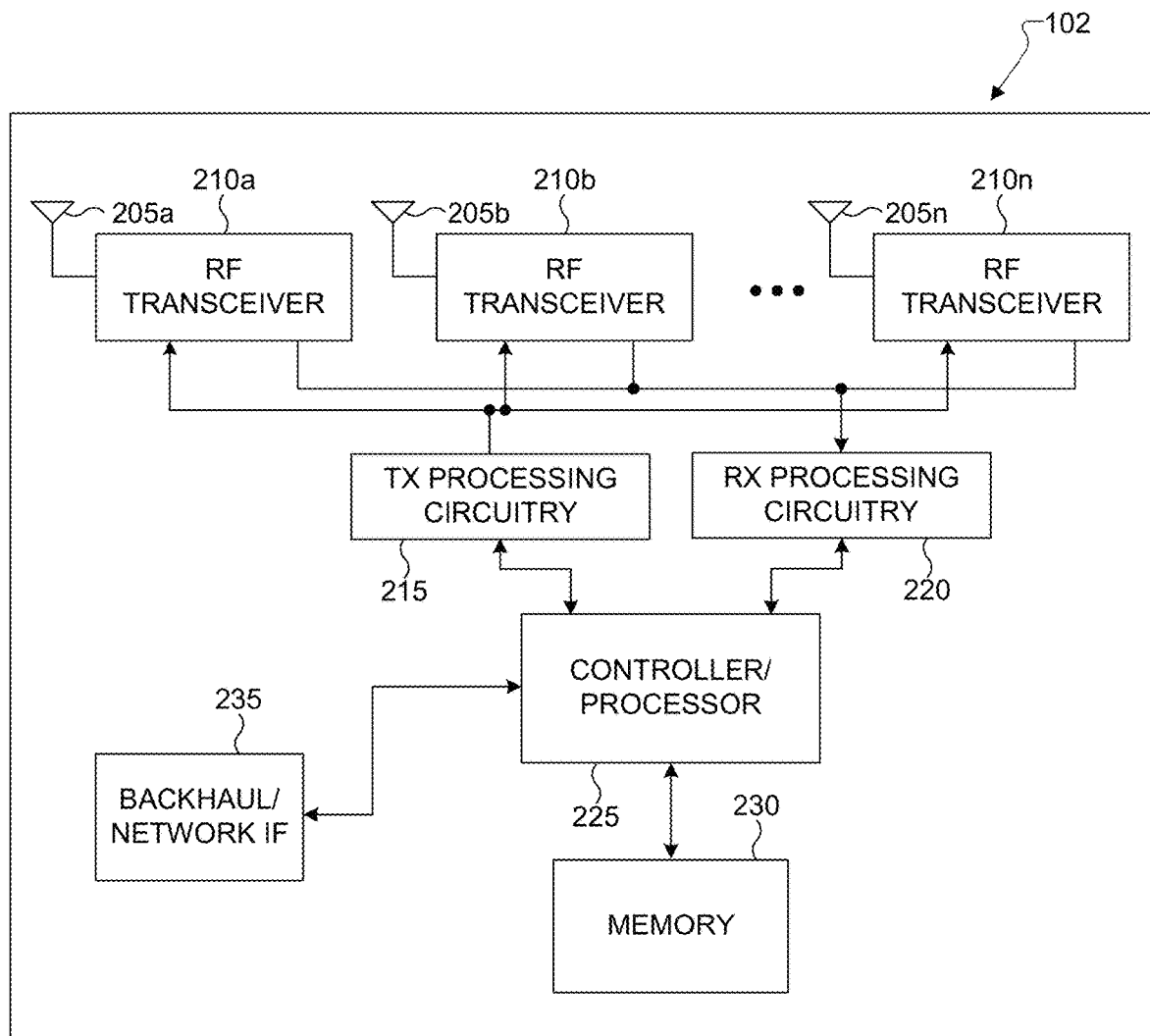
FIG. 2 illustrates an example gNB according to embodiments of the present disclosure.
Figure 3:
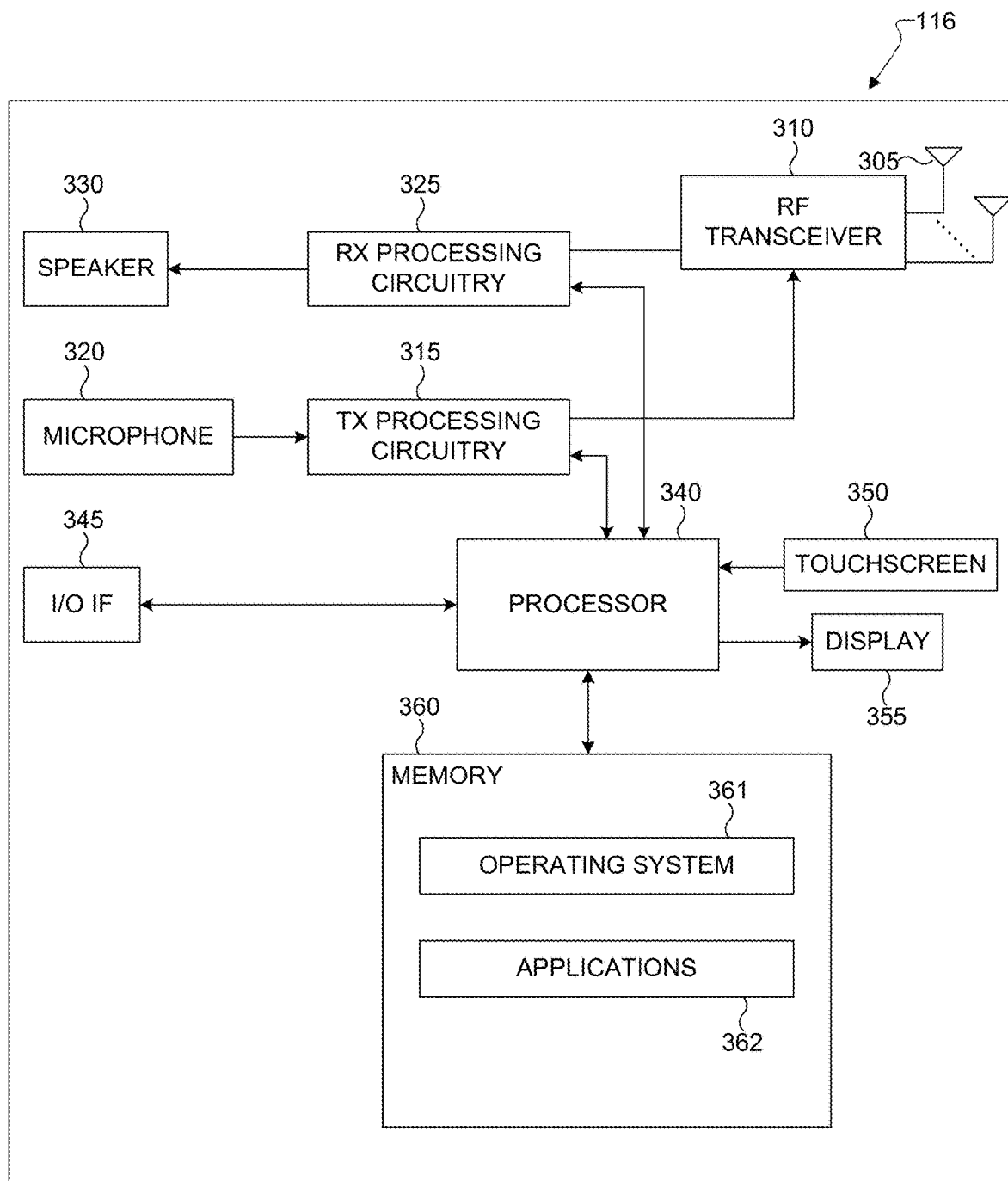
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network. In various embodiments, any of the gNBs 101, 102, or 103 may be a satellite base station as described hereinafter.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for time adjustment during handover in non-terrestrial networks. In certain embodiments, and one or more of the gNBs 101-103 includes circuitry, programming, or a combination thereof, for time adjustment during handover in non-terrestrial networks.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless (including satellite to earth and inter-satellite) connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the time adjustment during handover in non-terrestrial networks. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for time adjustment during handover in non-terrestrial networks. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mm Wave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, non-terrestrial networks, and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
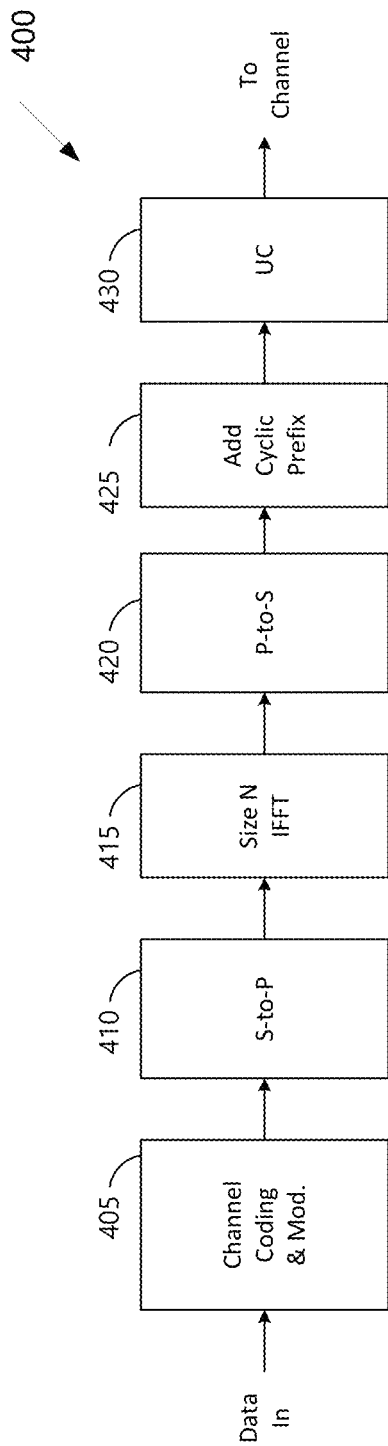
FIGS. 4 and 5 illustrate example wireless transmit and receive paths according to this disclosure.
Figure 5:
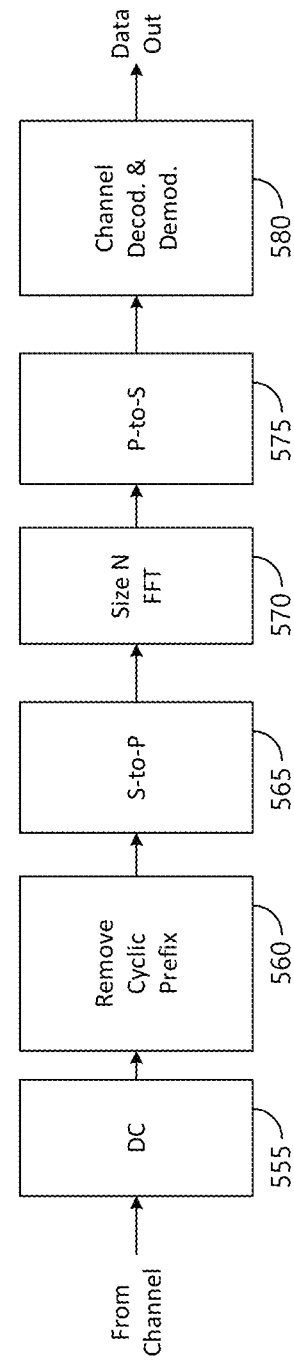

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems.

Figure 6:
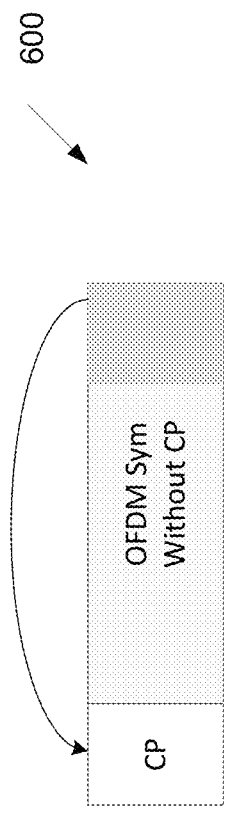
FIG. 6 illustrates an example physical uplink shared channel (PUSCH) and physical uplink control channel (PUCCH) with a cyclic prefix (CP) appended to the front of each symbol according to embodiments of the present disclosure.

FIG. 6 illustrates an example PUSCH and PUCCH and SRS with CP appended to the front of each symbol 600 according to embodiments of the present disclosure. An embodiment of the PUSCH and PUCCH and SRS with CP appended to the front of each symbol 600 shown in FIG. 6 is for illustration only.

NR uses CP-OFDM and DTF-s-OFDM waveforms for uplink transmissions, i.e., for physical uplink shared channel (PUSCH) and physical uplink control channel (PUCCH) and sounding reference signal (SRS). Both waveforms include a cyclic prefix (CP) appended to the front of each symbol as illustrated in FIG. 6.

The CP is the last few samples of the OFDM symbol appended to the front of the symbol. The base station estimates the round-trip-time between the UE and the base station, for example this can be initially estimated using the PRACH channel during random access, the base station signals a timing advance (TA) command to advance the UE's uplink transmission time by a duration equivalent to the round-trip-delay such that an uplink transmission from the UE, e.g., PUSCH or PUCCH arrives aligned to the base station reference timing as illustrated in FIG. 7.

Figure 7:
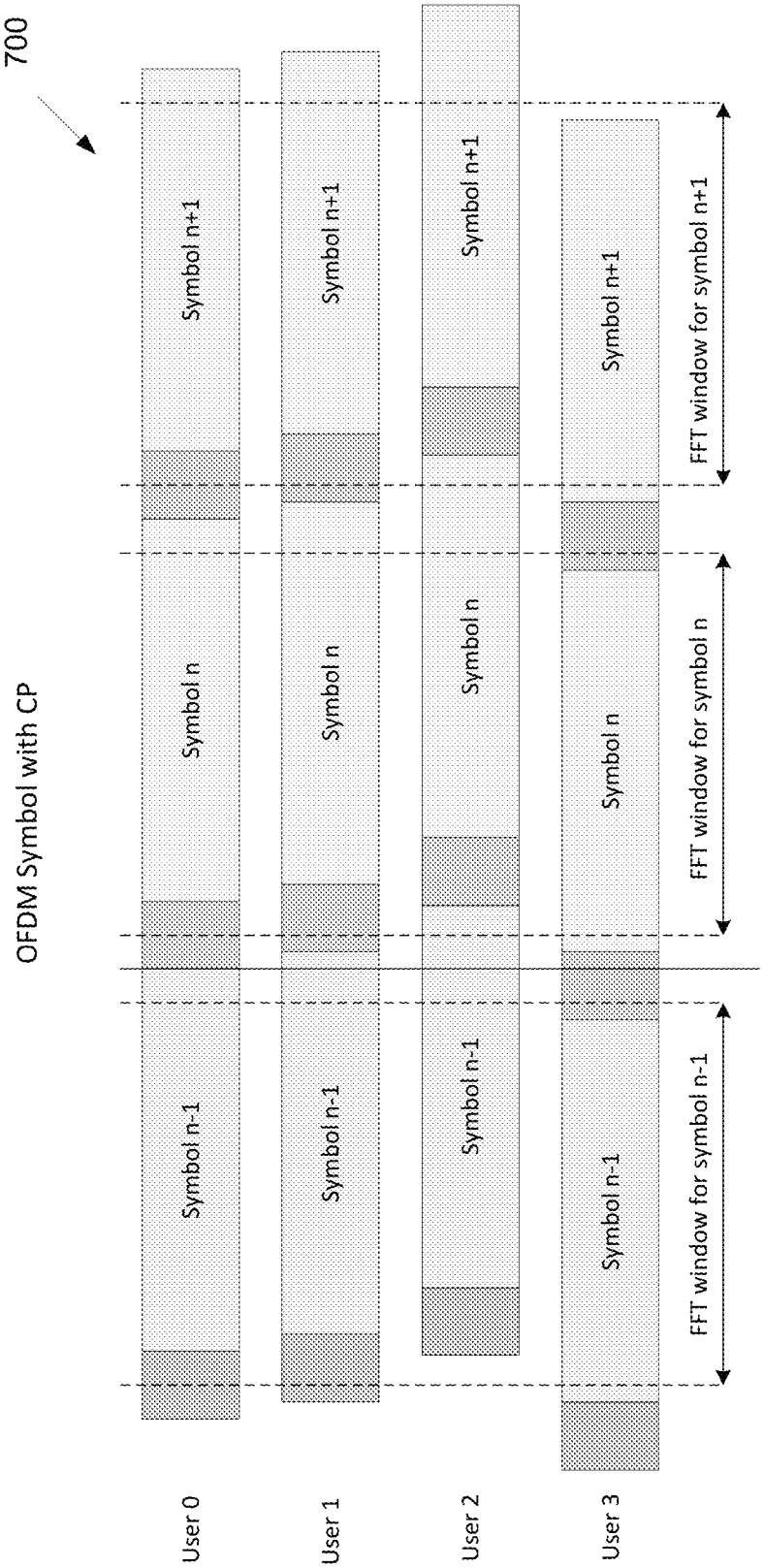
FIG. 7 illustrates an example user synchronization according to embodiments of the present disclosure.

FIG. 7 illustrates an example user synchronization 700 according to embodiments of the present disclosure. An embodiment of the user synchronization 700 shown in FIG. 7 is for illustration only.

All users are synchronized to the same reference time; this retains orthogonality between users. In FIG. 7, user's 0 start time, at the base station's receiver, for symbol n, for example symbol n can correspond to symbol zero of a radio frame, is exactly aligned to the reference time of the base station. For user 1, the start time of symbol n is slightly delayed from the base station's reference time. For user 2, the start time of symbol n is delayed even more from the base station's reference time this can be for example due to a time alignment error. For user 3, the start time of symbol n is advanced by a large duration from the base station's reference time, this can for example due to a time alignment error.

The first stage of a NR baseband receiver is the removal of the CP followed by a fast Fourier transform (FFT) operator that converts the OFDM symbol from time domain to frequency domain. An example of the FFT window is illustrated in FIG. 7. In this example, the FFT window of symbol n starts CP/2 after the base station's reference time, where CP is the duration of the cyclic prefix, the duration of the FFT window is large enough to include all the samples required for FFT operation. Note that in this example, as the FFT window is starting halfway through the CP rather than at the end of the CP, a time adjustment of CP/2 can be done in frequency domain (after the FFT) to compensate the CP/2 offset. If the user's misalignment is within the CP range, i.e., in the range of [−CP/2, CP/2] for the example illustrated in FIG. 7, the signal of user i is cyclically delayed by $\tau_i$, as long as $\tau_i$ is within the CP range.

For example, user 1 is delayed by $\tau_1$<CP/2, hence within the FFT window of symbol n all the samples belong to symbol n, there is no inter-symbol interference in this case. The delay $\tau_i$ when within the CP range is converted into a phasor after the FFT and can be easily estimated and compensated. If $\tau_i$ is greater than the CP range, inter symbol interference can occur, as illustrate in FIG. 7 for users 2 and 3. For user 2, $\tau_2$ exceeds CP2/, hence in the FFT window of symbol n, there are samples from symbol n−1 leading to inter-symbol interference and thus degrading performance. For user 3, $\tau_3$ is less than −CP2/, hence in the FFT window of symbol n, there are samples from symbol n+1 leading to inter-symbol interference and thus degrading performance.

In the present disclosure, some embodiments are provided to ensure that the timing to an initial uplink transmission, at the base stations receiver, from a UE to a target cell during handover is within the CP range to minimize any performance degradation.

In 3GPP standard specification release 17, a non-terrestrial network (NTN) refers to networks of spaceborne vehicles, operating between 2,000 to 35,786 km above Earth service, such as low earth orbiting (LEO) satellites, medium earth orbiting (MEO) satellites, geostationary earth orbiting (GEO) satellites as well as highly elliptical orbiting (HEO) satellites, as well as airborne vehicles, operating at 8 to 50 km above Earth service, such as high altitude platforms (HAPs). In case of spaceborne vehicles, the round trip time can be in the range of 100's of milliseconds.

3GPP standard provides an enhanced handover performance in a connected mode that enhancement necessary to consider location information (UE & Satellite/HAPS) and/or ephemeris in determining when to perform hand-over, in order to have a high degree of hand-over control for hand-over robustness and coverage management.

A handover operation occurs when a user, in connected mode, moves from the coverage area (cell) of a first base station, referred to as the source base station, to the coverage area (cell) of a second base station, referred to as the target base station. The handover procedure involves an RRC reconfiguration request triggered by the source base station and including several message exchanges between the target base station and the UE, part of the random access procedure in the target base station, at the end of this procedure radio resources are allocated in the target base station for data transmission.

Given the long round trip latency between the base station (satellite) and the UE, messages exchanged for the random access procedure and other control plane signaling can take hundreds of milliseconds if not more. This not only degrades the user experience, but can also impact higher layer protocols, such as timeout of TCP. While various embodiments discuss non-terrestrial networks, these embodiments descried in the present disclosure can also be used for terrestrial networks, for example, to reduce handover latency.

Figure 8:
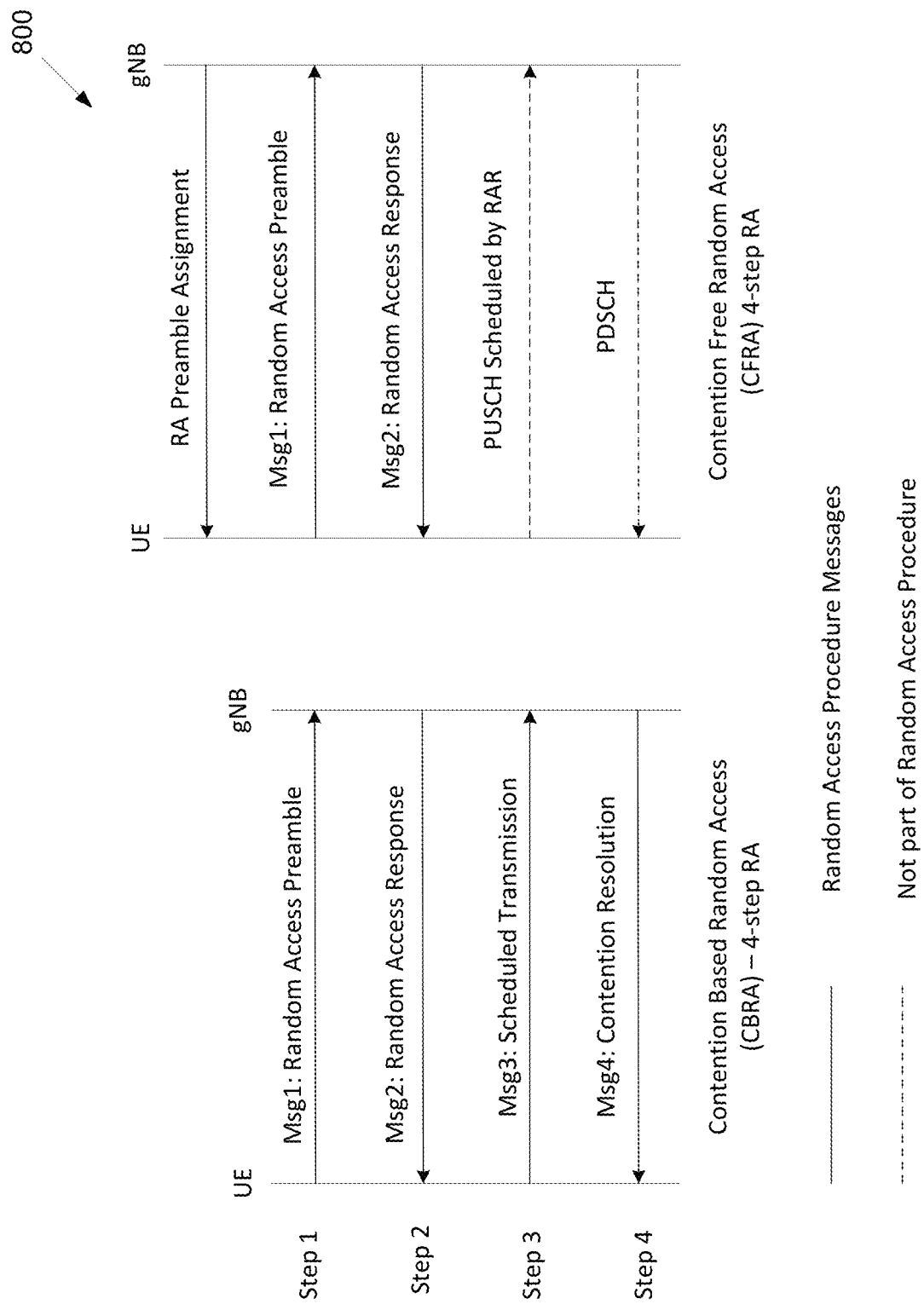
FIG. 8 illustrates an example signaling flow for a 4-step random access procedure.

The random access procedure can be a four-step random access procedure, also known as type-1 random access procedure as illustrated in FIG. 8.

FIG. 8 illustrates an example signaling flow for a 4-step random access procedure 800.

As illustrated in FIG. 8, in step 1, the UE transmits a random access preamble, also known as Msg1, to the base station. The base station attempts to receive and detect the preamble. In step 2, the base station (satellite) upon receiving the preamble transmits a random access response (RAR), also known as Msg2, to the UE including, among other fields, a TA command and an uplink grant for a subsequent PUSCH transmission. In step 3, the UE after receiving the RAR, transmits a PUSCH transmission scheduled by the grant of the RAR and time adjusted according to the TA received in the RAR. Msg3 or the PUSCH scheduled by the RAR UL grant can include the RRC reconfiguration complete message. In step 4, the base station (satellite) upon receiving the RRC reconfiguration complete message, allocates downlink and uplink resources that are transmitted in a downlink PDSCH transmission to the UE. After the last step, the UE can proceed with reception and transmission of data traffic. The four-step random access procedure (type-1 random access procedure) can be contention based random access (CBRA) or contention free random access (CFRA).

The CFRA procedure ends after the random access response, the following message are not part of the random access procedure.

Figure 9A:
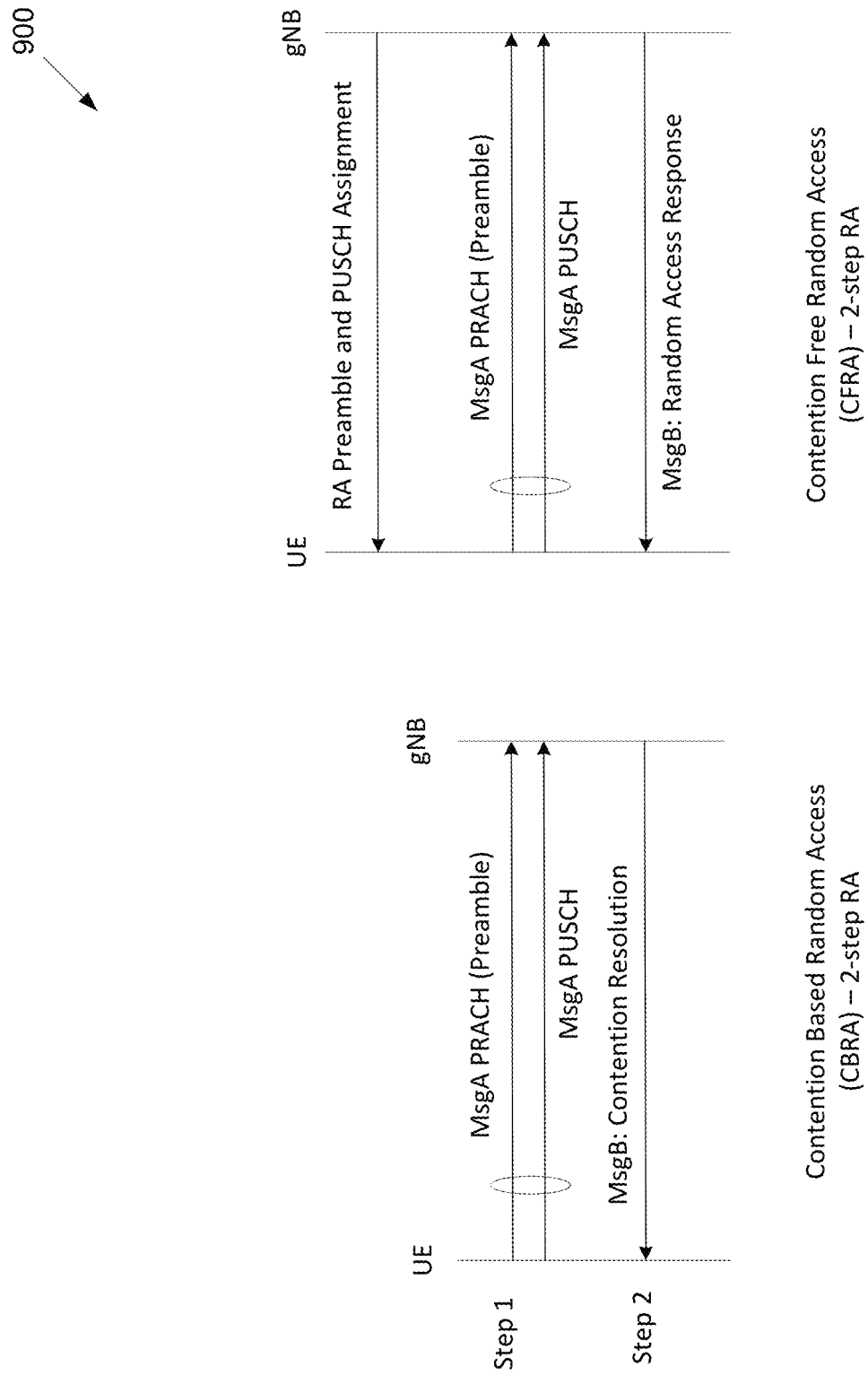
FIG. 9A illustrates an example signaling flow for a two-step random access procedure.

FIG. 9A illustrates an example signaling flow for a two-step random access procedure.

In 3GPP standard specification, 2-step RACH, also known as type-2 random access procedure is provided as illustrated in FIG. 9A, that combines the preamble and PUSCH transmission into a single transmission from the UE to the gNB, which is known as MsgA. Similarly, the RAR and the PDSCH transmission (e.g., Msg4) are combined into a single downlink transmission from the base station (satellite) to the UE, which is known as MsgB. While the type-2 random access procedure reduces the number of round-trip cycles of the random access procedure from two round trip cycles, in case of type-1 random access procedure, to one round trip cycle, this is still a relatively long time of up to several hundreds of milliseconds.

It has been provided that the UE starts downlink and uplink data transmissions to the target cell in parallel with the RACH procedure for RRC reconfiguration request on the target cell. The RACH procedure determines the TA value to apply to the PUSCH transmission such that the PUSCH transmission arrives at the base station (satellite) within the cyclic prefix range. If the UE starts transmitting PUSCH before the completion of the RACH procedure, the UE would not be able to acquire the TA from the RACH procedure to apply to the PUSCH transmission.

The PUSCH transmission arriving at the base station (satellite) of the target cell is outside the CP range, which would in turn degrade the reception performance of PUSCH and/or require more complex algorithms and processing at the base station (satellite) to receive PUSCH.

Alternatively, the UE can determine and/or estimate the delay to the base station (satellite) of the target cell, and adjust the transmit time of the PUSCH transmission to target cell such that the PUSCH arrives at the target cell within the CP range.

The second point above, i.e., how the UE determines and/or estimates the delay to the base station (satellite) of the target cell and applies this delay to a PUSCH transmission to ensure its arrival at the target cell within the CP range is the focus of this disclosure.

3GPP standard specification release 17 is targeting to expand the scope of NR to NTN. Given the very large distance between a UE on Earth and a satellite in space which can be 10's of thousands of kilometers away, the round trip time between a base station and a satellite could be in the 100's of milliseconds range. During handover from a source base station (satellite) to a target base station (satellite), the RACH procedure is invoked which requires multiple message-exchanges between the UE and the base station (satellite) before handover is complete and the communication link is switched over to the new satellite. This not only degrades the user's experience, but can also impact performance.

In the present disclosure, some embodiments are provided to estimate and apply uplink transmission timing of a target NTN cell associated with a base station (e.g., a satellite) before the RACH procedure is complete. The disclosure is applicable to various NTN types (e.g., GEOs, MEOs, LEOs, and HAPS; transparent and regenerative payloads including gNB or gNB-DU on the aerial/space vehicle, and fixed or moving beams). Parallel uplink transmissions and RACH procedure messages are also considered in the present disclosure.

This disclosure provides some embodiments to estimate and apply uplink transmission timing of a target NTN cell associated with a base station (e.g., a satellite) before the RACH procedure is complete. Parallel uplink transmissions and RACH procedure messages are considered in the present disclosure.

Figure 9B:
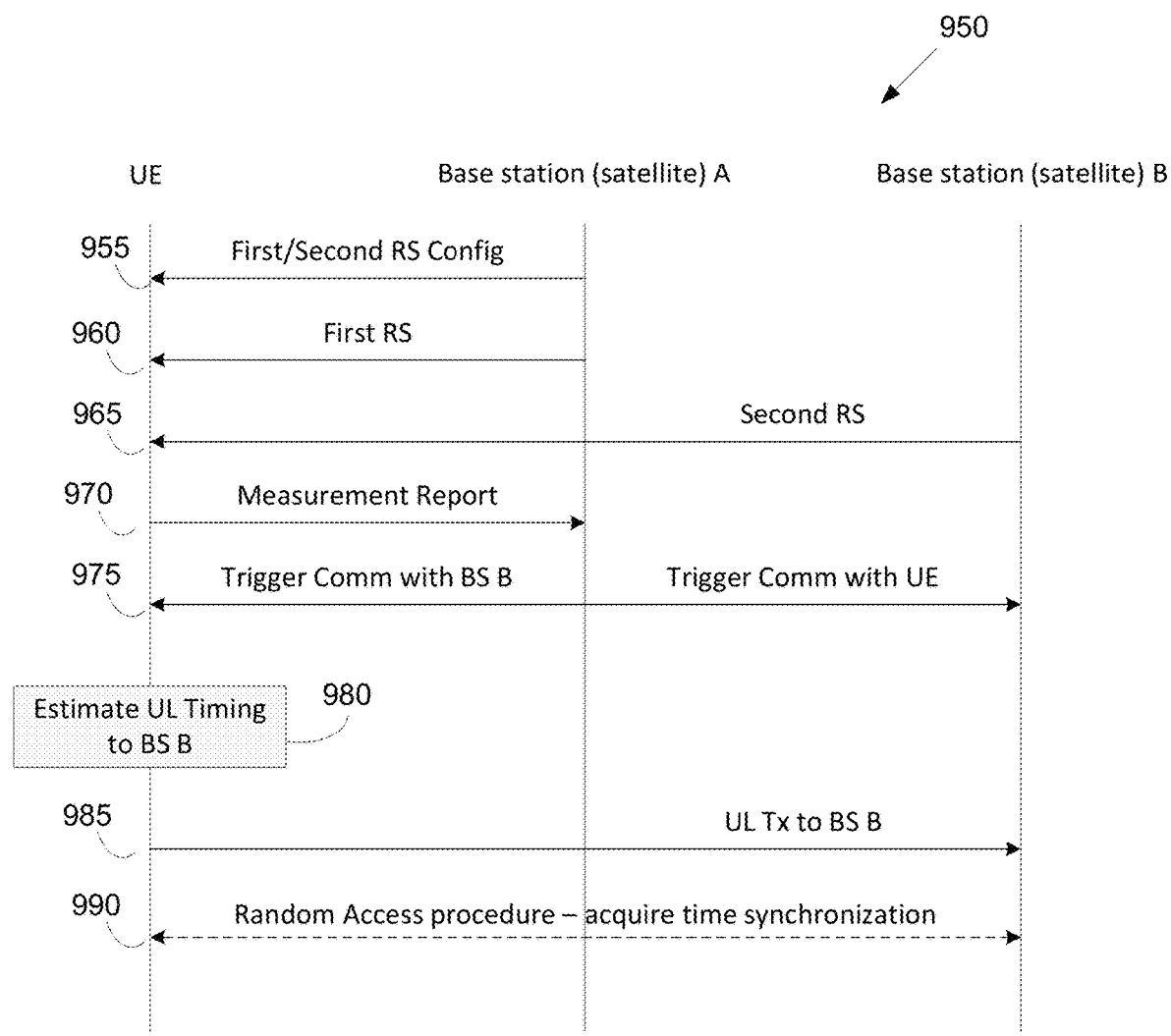
FIG. 9B illustrates flowchart of method for estimation and application of uplink transmission time and parallel uplink transmissions and downlink receptions according to embodiments of the present disclosure.
Figure 12:
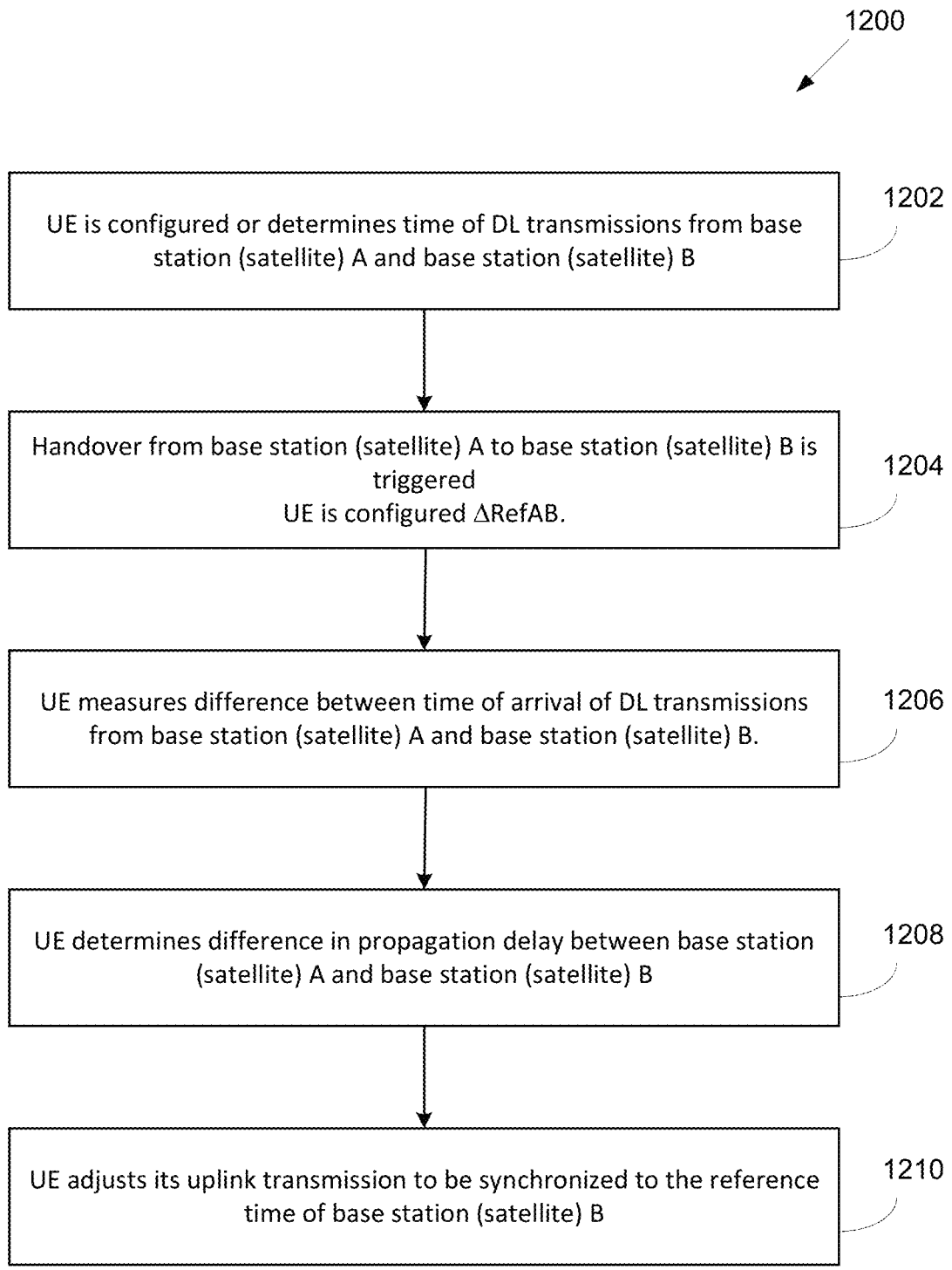
FIG. 12 illustrates a flowchart of method for UE procedure for time adjustment according to embodiments of the present disclosure.

FIG. 9B illustrates a flowchart of method 950 for estimation and application of uplink transmission time and parallel uplink transmissions and downlink receptions according to embodiments of the present disclosure. The method 950 as may be performed by a UE (e.g., 111-116 as illustrated in FIG. 1) and a complementary procedure may be performed by a base station, such as BS 102. An embodiment of the method 950 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

In this illustrative example, a UE is communicating with a base station (satellite) of a serving cell. This is base station (satellite) A. The serving cell has neighboring cells. One example of neighboring cells is neighboring cell B that is served by base station (satellite) B.

In step 955, a UE receives configuration information about a first reference signal (RS) transmitted from base station (satellite) A, and second RS transmitted from base station (satellite) B. For the RS transmitted from satellite B, in one example, is determined (configured) by base station (satellite) B and communicated to base station (satellite) A to configure to the UE; in another example, is determined (configured) by base station (satellite) A and communicated to base station (satellite) B to transmit.

In step 960, a base station (satellite) A transmits first RS. UE measures time of arrival of first RS and signal quality (e.g. L1-RSRP, L3-RSRP or SINR) of first RS.

In step 965, a base station (satellite) B transmits second RS. UE measures time of arrival of second RS and signal quality (e.g. L1-RSRP, L3-RSRP or SINR) of second RS.

In step 970, a UE provides measurement report to base station (satellite) A.

In step 975, a base station (satellite) A determines if UE should handover or communicate with base station (satellite) B:

Base station (satellite) A sends message to base station (satellite) B to trigger handover, or trigger communication between base station (satellite) B and UE. Base station (satellite) B can acknowledge the message back to base station (satellite) B.

Base station (satellite) A sends message to UE to trigger handover, or trigger communication between UE and base station (satellite) B. This message can include the difference between the reference time of base station (satellite) A and the reference time of base station (satellite) B. Alternatively. The differential reference time could have been communicated to the UE in an earlier step e.g. in step 1.

In step 980, a UE estimates the UL transmission timing to base station (satellite) B relative to the UL transmission timing to base station (satellite) A. This is described in greater detail regarding embodiments for estimation and application of uplink transmission time.

In step 985, the UE transmits uplink signals or channels to base station (satellite) B using the estimated time.

In step 990, as explained in embodiments for parallel uplink transmissions and downlink receptions, the UE can be further configured to perform random access procedure of Type-1 (4-step RACH) or of Type-2 (2-step RACH) towards base station (satellite) B. The random access procedure is in parallel with the UL transmissions to base station (satellite) B. The random access procedure can be for timing synchronization between the UE and base station (satellite) B. If the UE receives acknowledgment that the UL transmission of step 985 has been successfully received at base station (satellite) B, the random access procedure can be terminated.

In various embodiments, estimation and application of uplink transmission time is provided.

Figure 10A:
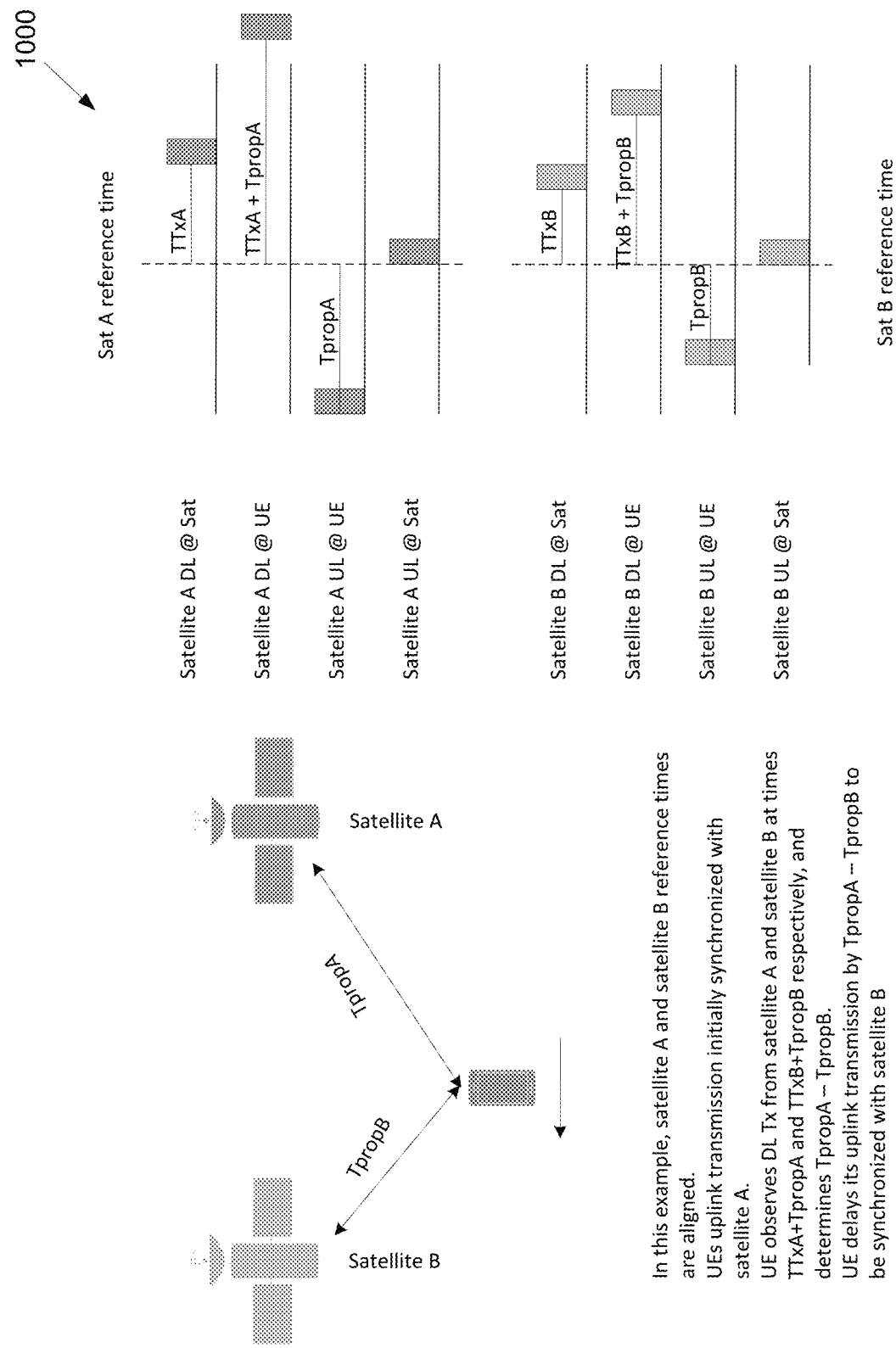
FIG. 10A illustrates a diagram 1000 of example UE communication with satellites according to embodiments of the present disclosure.
Figure 10B:
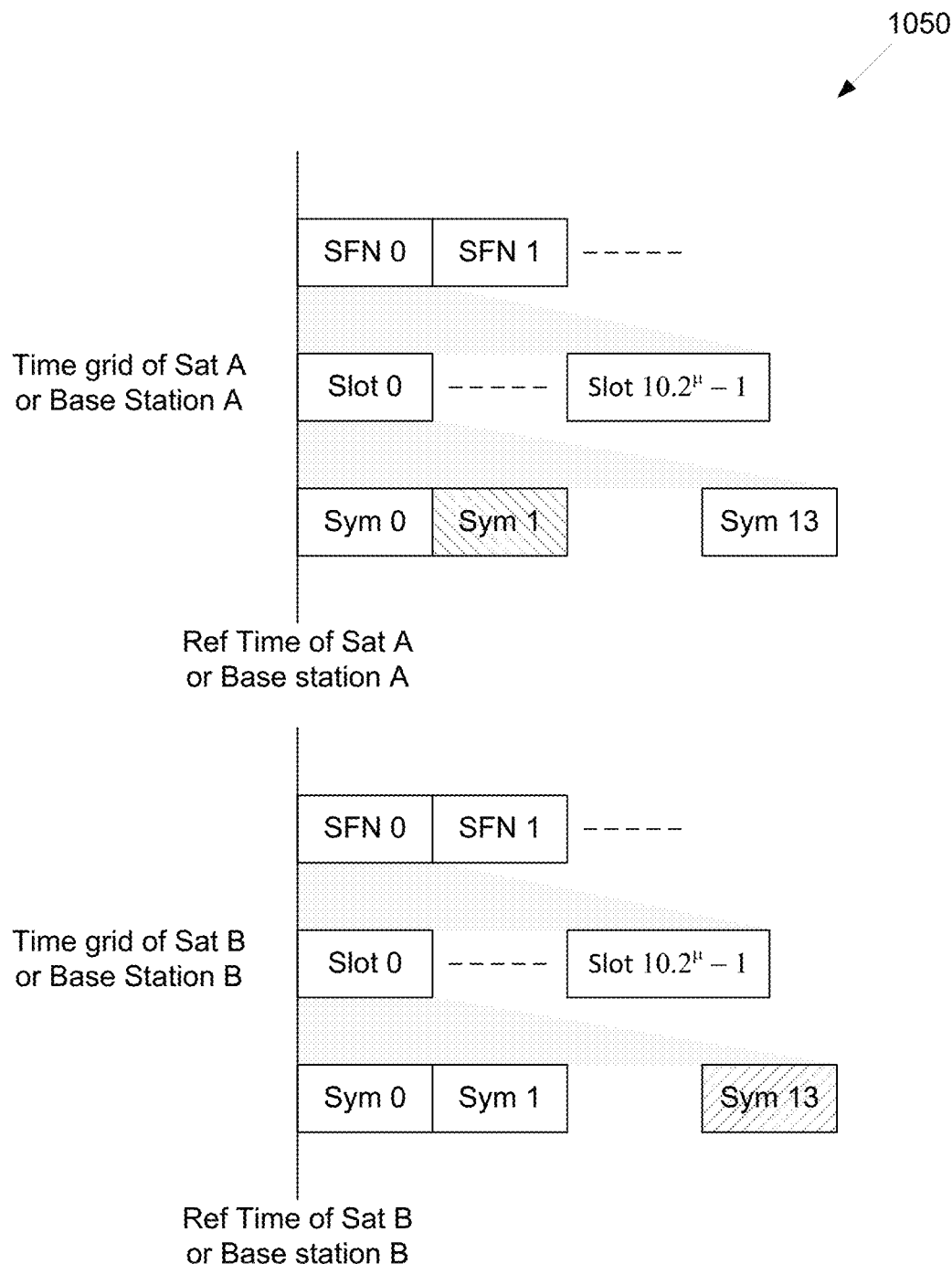
FIG. 10B illustrates a timing diagram 1050 for UE communication to embodiments of the present disclosure.

FIG. 10A illustrates a diagram 1000 of example UE communication with satellites according to embodiments of the present disclosure. FIG. 10B illustrates a timing diagram 1050 for UE communication according to embodiments of the present disclosure. The diagrams 1000 and 1050 shown in FIGS. 10A-10B are for illustration only.

FIG. 10A illustrates an example of a UE communicating with a first base station (satellite), a base station (satellite) A, and is moving into the range of a second base station (satellite), a base station (satellite) B. Base station (satellite) A is the serving base station (satellite) (i.e. the serving cell of the UE). Base station (satellite) B is a neighboring base station (satellite) (i.e. neighboring cell for the UE). When communicating with the base station (satellite) A, the uplink transmissions (e.g. PUSCH transmission) is synchronized such that the uplink transmission (e.g. PUSCH transmission) arrives at the base station (satellite) A at a reference time of the uplink transmission, within the CP range as described previously. The UE provides a measurement report to the base station (satellite) A. Based on the measurement report, base station (satellite A) can trigger the UE to communicate (i.e. receive downlink channels and transmit uplink channels) to base station (satellite) B. For example, the measurement report can be based on L3 Reference Signal Receive Power (RSRP) of the serving cell and the neighboring cell(s), L1 RSRP of the serving cell and the neighboring cell(s), a beam measurement report including beams from the serving cell and the neighboring cells, etc.

If the base stations (satellites) are not synchronized, or if the difference in round trip delay between the UE and each base station (satellite) is large (e.g. exceeds the Cyclic Prefix (CP) duration) such that an uplink signal transmitted by the UE and synchronized to the timing of base station (satellite) A arrives at base station (satellite) B outside the CP window (e.g. user 2 and user 3 of FIG. 7), the UE should receive a timing advance command or message from base station (satellite) B before starting to transmit to base station (satellite) B to avoid interference at base station (satellite) B. To determine the timing advance for base station (satellite) B, the UE can initiate a random access procedure (e.g. type-1 random access or type-2 random access) towards that base station (satellite), however this increases the latency to acquire timing and starting communication with base station (satellite) B. Instead, we propose that the UE estimates the time for transmission to base station (satellite) B before completion of the random access procedure or instead of the random access procedure.

In one example 1.1, a base station (satellite) A and a base station (satellite) B are synchronized such that the base station (satellite) A has the same reference time as the base station (satellite) B as illustrated in FIG. 10A. For example, the reference time within each base station can be the start of System Frame Number 0 (SFN 0) as shown in FIG. 10B. The base station (satellite) establishes its time grid which determines the transmission time of each SFN, each slot within the SFN and each symbol within each slot within each SFN relative to this reference time. In FIG. 10A and in FIG. 10B, the reference time of base station (satellite) A is the same as the reference time of base station (satellite) B. In FIG. 10B, $\mu$ is the Sub-Carrier Spacing Configuration, which determines the sub-carrier spacing (SCS). For example, $\mu=0$ is for SCS 15 kHz, $\mu=1$ is for SCS= 30 kHz, . . . in general for SCS configuration $\mu$ the SCS is $2^\mu \cdot 15$ kHz. The base station (satellite) A transmits a downlink signal at time $T_{TxA}$ relative to a reference time. In the example of FIG. 10B, the reference signal from base station (satellite) A is in Symbol 1 of Slot 0 of SFN 0, in this case, $T_{TxA}$ is the start of Symbol 1 of Slot 0 of SFN 0. For example, the reference signal can be an SS/PBCH block. In another example, the reference signal can be a CSI-RS. In another example, the reference signal can be PDCCH DM-RS or PDSCH DM-RS. The signal from base station (satellite) A undergoes a propagation delay $T_{PropA}$. The signal is received at the UE at time (relative to the reference time): $T_{DL\_UE\_A}=T_{TxA}+T_{PropA}$.

Base station (satellite B) transmits a downlink signal at time $T_{TxB}$ relative to its reference time. In the example of FIG. 10B, the reference signal from base station (satellite) B is in Symbol 13 of Slot 0 of SFN 0, in this case, $T_{TxB}$ is the start of Symbol 13 of Slot 0 of SFN 0. For example, the reference signal can be an SS/PBCH block. In another example, the reference signal can be a CSI-RS. In another example, the reference signal can be PDCCH DM-RS or PDSCH DM-RS. The signal is received at the UE at time (relative to the reference time): $T_{DL\_UE\_B}=T_{TxB}+T_{PropB}$.

The UE can determine the difference in propagation delay with the two base stations (satellites), i.e.:

$$T_{PropA}-T_{PropB}=(T_{DL\_UE\_A}-T_{TxA})-(T_{DL\_UE\_B}-T_{TxB}).$$

$$T_{PropA}-T_{PropB}=(T_{DL\_UE\_A}-T_{DL\_UE\_B})-(T_{TxA}-T_{TxB})$$

UE measures $T_{DL\_UE\_A}$ and $T_{DL\_UE\_B}$ and determines $(T_{DL\_UE\_A}-T_{DL\_UE\_B})$. UE determines $T_{TxA}$ and $T_{TxB}$ based on configuration and/or system specifications. Accordingly, the UE can determine $T_{PropA}-T_{PropB}$. The differential propagation delay between UE and each base station is defined as $T_{PropA}-T_{PropB}$. Alternatively, the differential propagation delay can be defined as $T_{PropB}-T_{PropA}$, which is the negation of the value provided by the previous equation, i.e. $T_{PropB}-T_{PropA}=(T_{DL\_UE\_B}-T_{DL\_UE\_A})-(T_{TxB}-T_{TxA})$. The differential propagation delay as defined is the one-way differential propagation delay. The round-trip differential propagation delay is double the one-way differential propagation delay.

The propagation path delay difference is the same in the downlink and uplink directions. When transmitting to the base station (satellite) B, the UE delays an uplink transmission by $T_{PropA}-T_{PropB}$ relative to the time it would have used when communicating with the base station (satellite) A. Alternatively, the UE advances its uplink transmission time by $T_{PropB}-T_{PropA}$ relative to the time it would have used when communicating with base station (satellite) A. This is to ensure that the uplink transmission is synchronized to the base station (satellite) B's reference time. A positive value of $T_{PropA}-T_{PropB}$ indicates a delay of uplink transmissions to the base station (satellite) B compared to that of the base station (satellite) A. A negative value of $T_{PropA}-T_{PropB}$ indicates an advance of uplink transmissions to the base station (satellite) B compared to that of the base station (satellite) A.

The time of transmissions of the downlink signals $T_{TxA}$ and $T_{TxB}$ can be specified by system specifications and/or configured or updated by higher layer RRC signaling and/or MAC CE signaling and/or L1 control signaling.

Figure 11A:
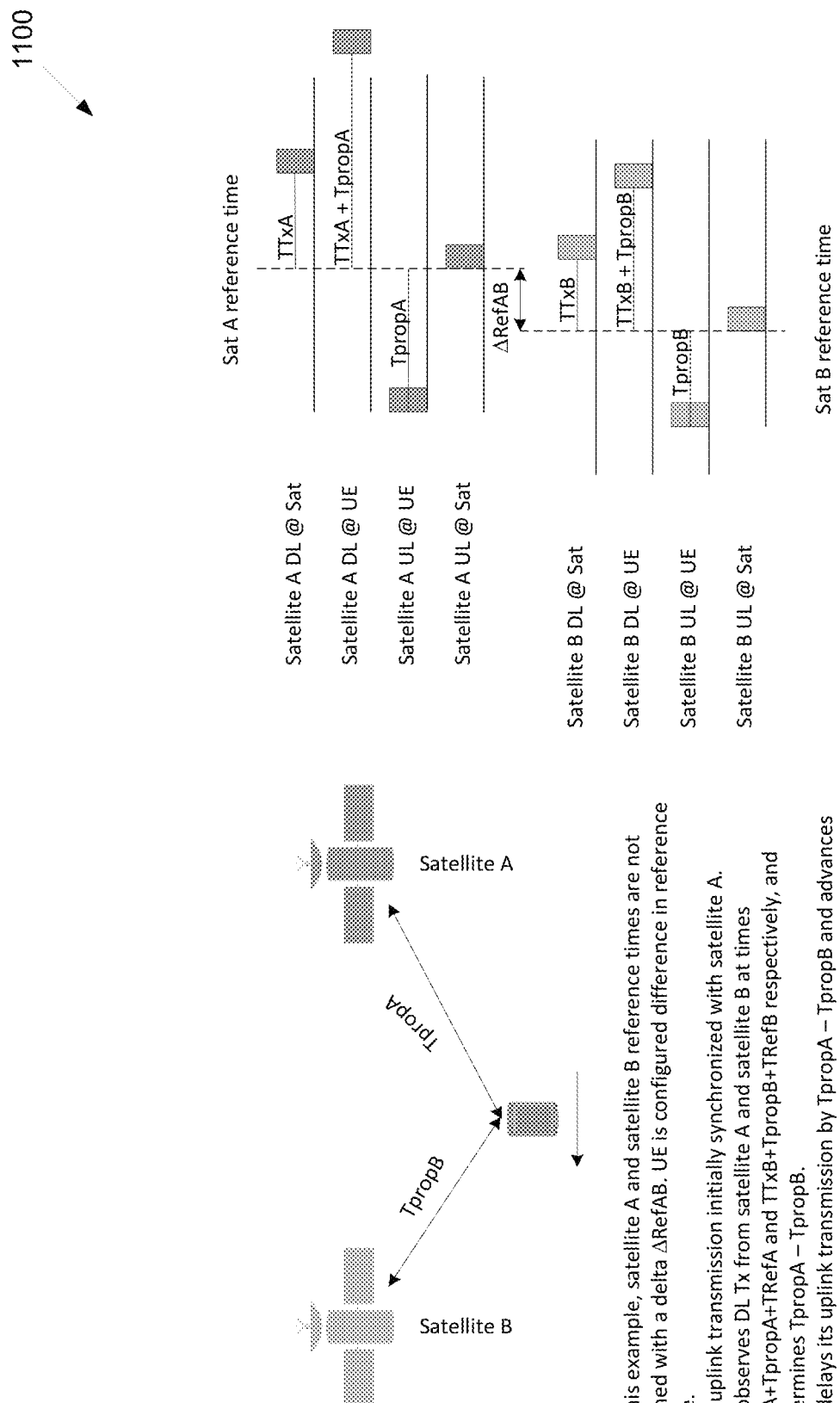
FIG. 11A illustrates a diagram of another example UE communication with satellites according to embodiments of the present disclosure.
Figure 11B:
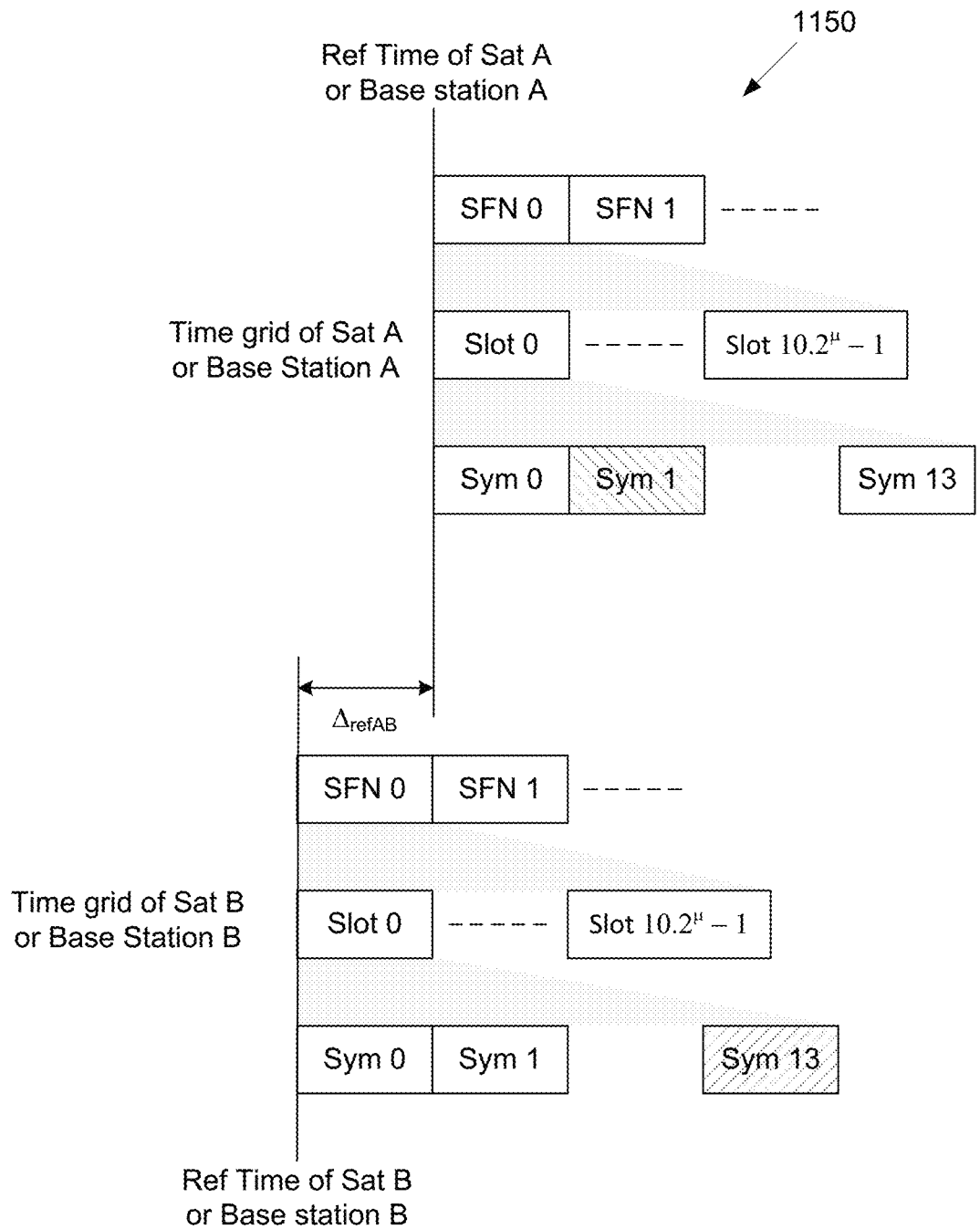
FIG. 11B illustrates a timing diagram for UE communication to embodiments of the present disclosure.

FIG. 11A illustrates a diagram 1100 of another example UE communication with satellites according to embodiments of the present disclosure. FIG. 11B illustrates a timing diagram 1150 for UE communication according to embodiments of the present disclosure. The diagrams 1100 and 1150 shown in FIGS. 11A-11B are for illustration only.

In another example 1.2, a base station (satellite) A and a base station (satellite) B have different reference times as illustrated in FIG. 11A. Let the base station (satellite) A's reference time be $T_{RefA}$ and the base station (satellite) B's reference time be $T_{RefB}$, the difference in reference time is: $\Delta_{RefAB}=T_{RefA}-T_{RefB}$. Alternatively, the reference time can be defined as $\Delta_{RefBA}=T_{RefB}-T_{RefA}$ which is the negation of $\Delta_{RefAB}$.

For example, the reference time within each base station (satellite) can be the start of System Frame Number 0 (SFN 0) as shown in FIG. 11B. The base station (satellite) establishes its time grid which determines the transmission time of each SFN, each slot within the SFN and each symbol within each slot within each SFN relative to this reference time. In FIG. 11B, the reference time of base station (satellite) A is after the reference time of base station (satellite) B by $\Delta_{RefAB}$. In FIG. 11B, μ is the Sub-Carrier Spacing Configuration, which determines the sub-carrier spacing (SCS). For example, μ=0 is for SCS 15 kHz, μ=1 is for SCS=30 kHz, . . . in general for SCS configuration μ the SCS is $2^\mu \cdot 15$ kHz.

The base station (satellite) A transmits a downlink signal at time $T_{TxA}$ relative to a reference time. In the example of FIG. 11B, the reference signal from base station (satellite) A is in Symbol 1 of Slot 0 of SFN 0, in this case, $T_{TxA}$ is the start of Symbol 1 of Slot 0 of SFN 0. For example, the reference signal can be an SS/PBCH block. In another example, the reference signal can be a CSI-RS. In another example, the reference signal can be PDCCH DM-RS or PDSCH DM-RS. The signal from the base station (satellite) A undergoes a propagation delay $T_{PropA}$. The signal is received at the UE at time: $T_{DL\_UE\_A}=T_{RefA}+T_{TxA}+T_{PropA}$.

The base station (satellite) B transmits a downlink signal at time $T_{TxB}$ relative to a reference time. In the example of FIG. 11B, the reference signal from base station (satellite) B is in Symbol 13 of Slot 0 of SFN 0, in this case, $T_{TxB}$ is the start of Symbol 13 of Slot 0 of SFN 0. For example, the reference signal can be an SS/PBCH block. In another example, the reference signal can be a CSI-RS. In another example, the reference signal can be PDCCH DM-RS or PDSCH DM-RS. The signal from the base station (satellite) B undergoes a propagation delay $T_{PropB}$. The signal is received at the UE at time: $T_{DL\_UE\_B}=T_{RefB}+T_{TxB}+T_{PropB}$.

The UE can determine the difference in propagation delay with the two base stations (satellites), i.e.:

$$T_{PropA}-T_{PropB}=(T_{DL\_UE\_A}-T_{TxA}-T_{RefA})-(T_{DL\_UE\_B}-T_{TxB}-T_{RefB})=(T_{DL\_UE\_A}-T_{TxA})-(T_{DL\_UE\_B}-T_{TxB})-\Delta_{RefAB}.$$

$$T_{PropA}-T_{PropB}=(T_{DL\_UE\_A}-T_{DL\_UE\_B})-(T_{TxA}-T_{TxB})-\Delta_{RefAB}$$

UE measures $T_{DL\_UE\_A}$ and $T_{DL\_UE\_B}$ and determines $(T_{DL\_UE\_A}-T_{DL\_UE\_B})$. UE determines $T_{TxA}$ and $T_{TxB}$ based on configuration and/or system specifications. $\Delta_{RefAB}$ is configured/updated by network. Accordingly, the UE can determine $T_{PropA}-T_{PropB}$. The differential propagation delay between UE and each base station is defined as $T_{PropA}-T_{PropB}$. Alternatively, the differential propagation delay can be defined as $T_{PropB}-T_{PropA}$, which is the negation of the value provided by the previous equation, i.e. $T_{PropB}-T_{PropA}=(T_{DL\_UE\_B}-T_{DL\_UE\_A})-(T_{TxB}-T_{TxA})-\Delta_{RefBA}$.

Wherein, $\Delta_{RefBA}=-\Delta_{RefAB}$. Either $\Delta_{RefAB}$ or $\Delta_{RefBA}$ is configured/updated by network. The differential propagation delay as defined is the one-way differential propagation delay. The round-trip differential propagation delay is double the one-way differential propagation delay.

The propagation path delay difference is the same in the downlink and uplink directions. When transmitting to the base station (satellite) B, the UE: (1) delays an uplink transmission by $T_{PropA}-T_{PropB}$ to compensate for the propagation delay differences (alternatively, the UE advances its uplink transmission time by $T_{PropB}-T_{PropA}$); and/or (2) advances an uplink transmission time by $\Delta_{RefAB}$ to compensate for difference in reference time between the base station (satellite) A and the base station (satellite) B relative to the time the UE would have used when communicating with satellite A.

In aggregation operation, the UE delays an uplink transmission time by $T_{PropA}-T_{PropB}-\Delta_{RefAB}$ when transmitting to the base station (satellite) B) relative to the time the UE would have used to transmit to the base station (satellite) A. Alternatively, the UE advances its uplink transmission time by $T_{PropB}-T_{PropA}-\Delta_{RefBA}$ relative to the time it would have used when communicating with base station (satellite) A. This is to ensure that the uplink transmission is synchronized to the base station (satellite) B's reference time. A positive value of $T_{PropA}-T_{PropB}-\Delta_{RefAB}$ indicates a delay of uplink transmissions to the base station (satellite) B compared to that of the base station (satellite) A. A negative value of $T_{PropA}-T_{PropB}-\Delta_{RefAB}$ indicates an advance of uplink transmissions to the base station (satellite) B compared to that of the base station (satellite) A.

The time of transmissions of the downlink signals $T_{TxA}$ and $T_{TxB}$ can be specified by system specifications and/or configured or updated by higher layer RRC signaling and/or MAC CE signaling and/or L1 control signaling.

The difference in time between the reference time of the base station (satellite) A and that of the base station (satellite) B can be configured or updated by higher layer RRC signaling and/or MAC CE signaling and/or L1 control signaling.

FIG. 12 illustrates a flowchart of method 1200 for UE procedure for time adjustment according to embodiments of the present disclosure. The method 1200 as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, in step 1202, a UE can be configured or determines based on system specification the time of downlink transmissions, i.e., reference signals used to estimate the propagation delay difference between the two base stations (satellites). For example, the configuration of the reference signal can include the SFN, the slot, and/or the symbol in which the reference signal is transmitted.

The UE provides measurement reports to base station (satellite) A. The measurement report can be based on L3 Reference Signal Receive Power (RSRP) of the serving cell (base station (satellite) A) and the neighboring cell(s) (base station(s) (satellite(s)) B), L1 RSRP of the serving cell (base station (satellite) A) and the neighboring cell(s) (base station(s) (satellite(s)) B), a beam measurement report including beams from the serving cell (base station (satellite) A) and the neighboring cells (base station(s)

(satellite(s)) B), etc. Based on the measurement report, base station (satellite) A can decide if the UE is to communicate (i.e. receive downlink channels and transmit uplink channels) with base station (satellite) B.

Accordingly, in step 1204, handover from base station (satellite) A to base station (satellite) B is triggered, or the UE can be triggered to communicate with base station (satellite) B without triggering a handover. Wherein, a handover involves a serving cell change from base station (satellite) A to base station satellite B. If the base stations (satellites) are not synchronized with the same reference time, the UE can be configured a difference between the reference time of the base stations (satellites), i.e. $\Delta_{RefAB}$ or ($\Delta_{RefBA}$). $\Delta_{RefAB}$ or ($\Delta_{RefBA}$) can be part of the handover command (or the message to trigger the UE to communicate with base station (satellite) B without handover) or can be separately configured or updated from the handover command (or the message to trigger the UE to communicate with base station (satellite) B without handover).

In step 1206, the UE measures the difference in time of arrival between the downlink transmissions, i.e., reference signals from the base station (satellite) A and the base station (satellite) B.

In step 1208, as aforementioned embodiments/examples, the UE can determine the propagation path delay difference to each base station (satellite).

In step 1210, the UE adjusts an uplink transmission time, as described earlier in this disclosure, to align to the reference time of the base station (satellite) B.

Figure 13:
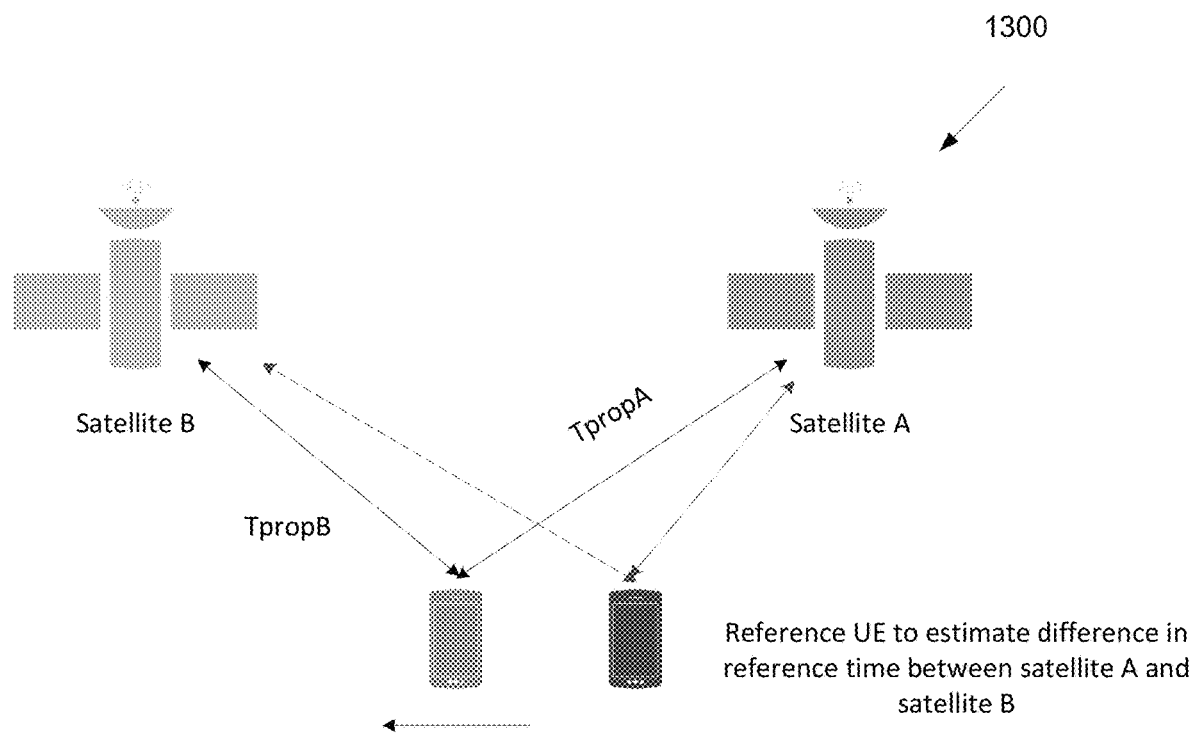
FIG. 13 illustrates a diagram of example UE communication with satellites according to embodiments of the present disclosure.

In another example 1.3, there is a drift between the reference time of a base station (satellite) A and a base station (satellite) B. A reference UE is used to estimate the time difference between the reference time of the base station (satellite) A and the reference time of the base station (satellite) B as illustrated in FIG. 13. The estimated time difference is configured to the UE(s) performing handover.

In one example, the reference UE and each base station (satellite) determine the round trip delay between the reference UE (itself) and each base station (satellite). For example, based on the time of arrival of a PRACH preamble at each base station from the reference UE. The reference UE determines the one-way delay, i.e. $T_{PropA}$ and $T_{PropB}$, to each base station (satellite), this is half the round-trip delay to each base station (satellite).

The reference UE measures the time of arrival of the reference signals from each base station satellite $T_{DL\_UE\_A}$ and $T_{DL\_UE\_A}$. The time between the reference point of base station (satellite) A and the reference point of base station (satellite) B can be calculate by the reference UE as:

$$\Delta_{RefAB} = (T_{DL\_UE\_A} - T_{DL\_UE\_B}) - (T_{TxA} - T_{TxB}) - (T_{PropA} - T_{PropB})$$

or $$\Delta_{RefBA} = (T_{DL\_UE\_B} - T_{DL\_UE\_A}) - (T_{TxB} - T_{TxA}) - (T_{PropB} - T_{PropA})$$

The reference UE can provide $\Delta_{RefAB}$ to $\Delta_{RefAB}$ to base station (satellite A) or base station (satellite) B by RRC signaling and/or MAC CE signaling and/or L1 control signaling. Alternatively, the UE can provide the relative time of arrival of the reference signal from one base station (e.g. base station (satellite B)) to the reference signal from the other base station (base station (satellite) A), i.e., the UE provides $(T_{DL\_UE\_B} - T_{DL\_UE\_A})$ or $(T_{DL\_UE\_A} - T_{DL\_UE\_B})$ to one of the base stations. The base station calculates $\Delta_{RefBA}$ or $\Delta_{RefAB}$.

FIG. 13 illustrates a diagram 1300 of example UE communication with satellites according to embodiments of the present disclosure. The diagram 1300 shown in FIG. 13 is for illustration only.

In one example, a satellite is used as an example of a base station for illustration purposes. However, this disclosure is applicable to any base station type.

In example, a satellite can be a relay for regenerating the traffic from a base station on the ground, and the propagation delay in the examples and illustrations refers to the round-trip delay between the base station on the ground and UE, using satellite as a relay.

In one embodiment, parallel uplink transmissions and downlink receptions are provided.

A user is in a serving cell communicating with a serving base station (satellite). The user is moving towards a neighboring cell and would establish a communication link with the base station (satellite) of the neighboring cell. In order to speed up handover or communication with a neighboring cell without handover, uplink and downlink data transmissions can proceed, using UE-dedicated UL channels and UE-dedicated DL channels, in parallel with the RACH procedure and other control messages, if any, for RRC reconfiguration in a neighboring cell.

A UE-dedicated UL channel can be a PUSCH channel transmitted by the UE containing UL data including control plane and user plane data. A UE dedicated UL channel can also be a PUCCH channel transmitted by the UE including UCI information (e.g. HARQ-ACK in response to PDSCH reception, CSI, or SR). A UE dedicated UL signal such as SRS can also be transmitted by the UE in parallel with the RACH procedure.

A UE-dedicated DL channel can be a PDSCH channel transmitted by the UE containing UE-specific DL data including control plane and user plane data. A UE dedicate DL channel can also be a PDCCH channel for example transmitted in a User Specific Search Space (USS). A UE dedicated DL signal such as CSI-RS can also be transmitted to the UE in parallel with the RACH procedure.

In one example, the UL transmission on PUSCH to the neighbor cell before RACH procedure is complete can be scheduled by the serving cell, e.g. using a DCI format for UL scheduling from serving cell (e.g. DCI Format 0_0, DCI Format 0_1, DCI Format 0_2).

In one example, the UL transmission on PUSCH to the neighbor cell before RACH procedure is complete can be configured (e.g. for configured grant Type 1 and configured grant Type 2) by the serving cell, e.g. by RRC signaling.

In one example, the UL transmission on PUSCH to the neighbor cell before RACH procedure is complete can scheduled by the neighboring cell, e.g. using a DCI format for UL scheduling from neighboring cell (e.g. DCI Format 0_0, DCI Format 0_1, DCI Format 0_2).

In one example, the UL transmission on PUCCH to the neighbor cell before RACH procedure is complete can be configured by the serving cell, e.g. by RRC signaling.

In one example, the UL transmission on PUCCH to the neighbor cell before RACH procedure is complete can be in response to a PDSCH transmission on the neighboring cell (i.e. HARQ-ACK feedback).

In one example, the serving cell configures the UE, before RACH procedure is complete, with a UE Specific Search Space (USS) on the neighboring cell for the UE to receive PDCCH from the neighboring cell.

In one example, the serving cell configures the UE, before RACH procedure is complete, with a Common Search Space (CSS) on the neighboring cell for the UE to receive PDCCH from the neighboring cell.

In example, the neighboring cell can receive an indication from the serving cell to start communicating with the UE using UE-dedicated UL channels and UE-dedicated DL channels before RACH procedure is complete.

In example, the UE can receive an indication from the serving cell to start communicating with the neighboring cell using UE-dedicated UL channels and UE-dedicated DL channels before RACH procedure is complete.

In one example, there is no RACH procedure triggered and the neighboring cell and UE start communicating after receiving indication/configuration from the serving cell.

In these embodiments, parallel transmissions of uplink data related transmissions and uplink transmission related to the RACH procedure in a same cell are provided. For example, the cell can be the target cell of handover. The RACH procedure is used to determine the round-trip time between the UE and the base station (satellite), part of the RACH procedure is inclusion of the Timing Advance (TA) in the random access response (RAR) to inform the UE of the TA to use for uplink transmissions. Before the TA command is known to the UE, the UE can estimate the TA to use for uplink transmission in the target cell following the methods described in component 1. The UE can transmit uplink channels or signals (e.g. PUSCH, PUCCH or SRS) using the estimated TA in parallel with, or instead of, the RACH procedure that part of the handover procedure.

Figure 14A:
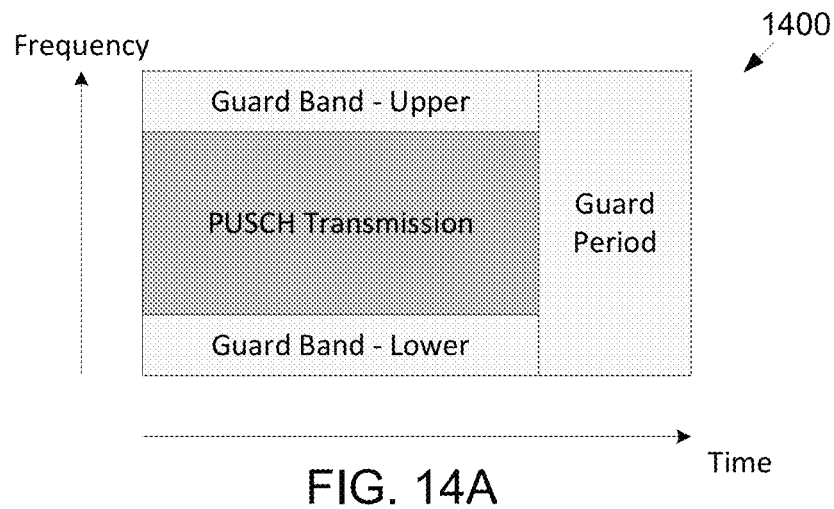
FIGS. 14A-14C illustrate example guard periods for PUSCH according to embodiments of the present disclosure.
Figure 14B:
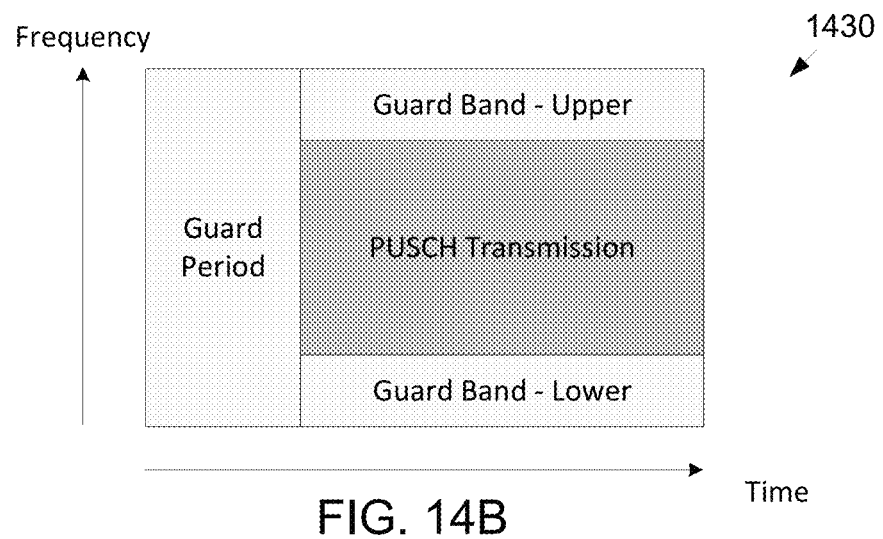
Figure 14C:
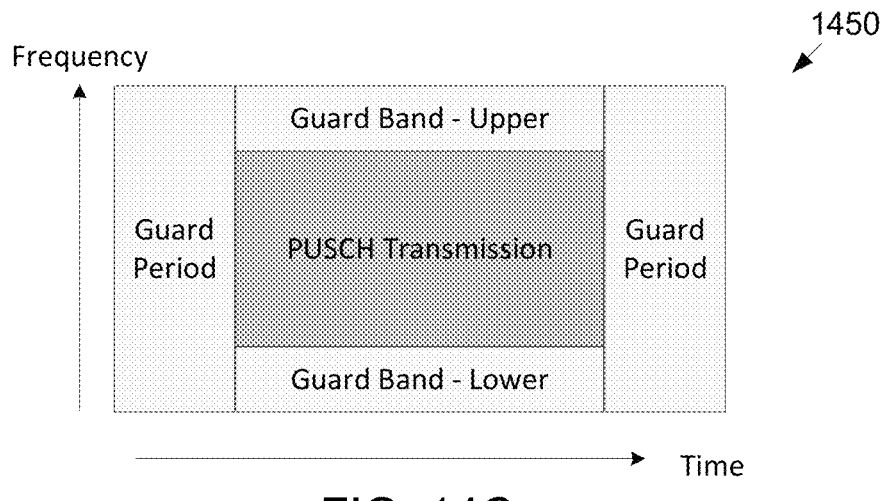

FIGS. 14A-14C illustrate example guard periods and guard bands for PUSCH 1400, 1430, and 1450 according to embodiments of the present disclosure. The embodiments of the guard periods and guard bands for PUSCH 1400, 1430, and 1450 shown in FIGS. 14A-14C are for illustration only.

In one example 2.1, a UE is independently configured to transmit PUSCH and trigger a RACH procedure (either Type-1 random access procedure or Type-2 random access procedure).

In such example, PUSCH can have a guard period and guard band as TA is unknown, or has an estimation error, before completion of RACH procedure as illustrated in FIG. 14A. The guard period can be in number of OFDM symbols and/or in number of slots. The guard band can be in number of PRBs and/or in number of sub-carriers. The guard band can be on one side of the transmission or on both sides as illustrated in FIGS. 14A-14C.

In such example, the size of the guard period and/or the size of the guard band can be specified in system specifications and/or configured or update by higher layer RRC signaling and/or MAC CE signaling and/or L1 control signaling.

In such example, the size of the guard period and/or the size of the guard band can be specified in system specifications and/or configured or updated by higher layer RRC signaling and/or MAC CE signaling and/or L1 control signaling, and the presence or absence of the guard period and/or guard band can be configured or updated by higher layer RRC signaling and/or MAC CE signaling and/or L1 control signaling.

The presence of a guard band and/or a guard period is due to a timing error in the UL transmission time the UE determines or estimates for the transmission of the PUSCH channel. If the timing error exceeds the CP window (e.g. as illustrated in FIG. 7 for user 2 and user 3), the UL PUSCH channel can interfere with other users at the base station receiver. To mitigate these effects a guard band and/or a guard period is inserted (there is no signal transmitted in the guard band and the guard period).

The guard period, which can also be referred to as the guard time, can be after the PUSCH transmission as illustrated in FIG. 14A or before the PUSCH transmission as illustrated in FIG. 14B or split before and after the PUSCH transmission as illustrated in FIG. 14C.

In one example 2.1.1, PUSCH can be semi-statically configured (e.g., configured grant Type 1 or configured grant Type 2).

In another example 2.1.2, PUSCH can be dynamically scheduled.

The PUSCH transmissions and RACH procedure messages are independent.

In one example 2.1.3, PUSCH is transmitted before MsgA preamble (2-step RACH) or Msg1 (4-step RACH).

In another example 2.1.4, PUSCH is transmitted at the same time (slot) as MsgA preamble or Msg1. In one example 2.1.4.1, PUSCH and MsgA preamble or Msg1 proceed in parallel (in different PRBs). In another example 2.1.4.2, PUSCH transmission is dropped and MsgA preamble or Msg1 proceeds. In another example 2.1.4.3, MsgA preamble or Msg1 is dropped and the PUSCH transmission proceeds.

In another example 2.1.5, PUSCH is transmitted between MsgA preamble and MsgA PUSCH or between Msg1 and Msg3 or a PUSCH scheduled by a RAR UL grant.

In another example 2.1.6, PUSCH is transmitted at the same time or overlaps with MsgA PUSCH or Msg3 or a PUSCH scheduled by a RAR UL grant.

In one example 2.1.6.1, PUSCH and MsgA PUSCH or Msg3 or a PUSCH scheduled by a RAR UL grant proceed in parallel (in different PRBs).

In another example 2.1.6.2, PUSCH transmission is dropped and MsgA PUSCH or Msg3 or a PUSCH scheduled by a RAR UL grant proceeds.

In another example 2.1.6.3, MsgA PUSCH or Msg3 or a PUSCH scheduled by a RAR UL grant is dropped and the PUSCH transmission proceeds.

In another example 2.1.6.4, the PUSCH transmission and the MsgA PUSCH or Msg3 or a PUSCH scheduled by a RAR UL grant are combined into a single PUSCH message that can use the resources of the original PUSCH transmission or that of MsgA PUSCH or that of Msg3 or a PUSCH scheduled by a RAR UL grant.

In another example 2.1.7, PUSCH is transmitted after MsgA PUSCH or Msg3 or a PUSCH scheduled by a RAR UL grant. In one example 2.1.7.1, PUSCH and MsgA PUSCH or Msg3 or a PUSCH scheduled by a RAR UL grant proceed in parallel (in different PRBs). In another example 2.1.7.2, PUSCH transmission is dropped and MsgA PUSCH or Msg3 or a PUSCH scheduled by a RAR UL grant proceeds. In another example 2.1.7.3, MsgA PUSCH or Msg3 or a PUSCH scheduled by a RAR UL grant is dropped and the PUSCH transmission proceeds. In another example 2.1.7.4, the PUSCH transmission and the MsgA PUSCH or Msg3 or a PUSCH scheduled by a RAR UL grant are combined into a single PUSCH message that can use the resources of the original PUSCH transmission or that of MsgA PUSCH or that of Msg3 or a PUSCH scheduled by a RAR UL grant.

The random access procedure can be contention free random access (CFRA) or contention based random access (CBRA).

In one example 2.1.8, the PUSCH transmission and random access procedure have no interaction. In one instance, the user traffic scheduling on PUSCH is separately carried out from the uplink RRC signaling scheduling on the PUSCH so that RRC signaling on PUSCH follows Random Access Response-assigned UL resources in case of the 4-step RA procedure so that the random access signaling and user traffic remain independent.

In another example 2.1.9, if the PUSCH is successfully received at gNB, the RACH procedure, or remaining RACH messages are canceled.

In one example 2.1.9.1, if PUSCH is successfully received before RAR message, gNB can indicate in the RAR that a PUSCH has been successfully received and terminate the random access procedure.

In another example 2.1.9.2, if a PUSCH is successfully received after the RAR message has been sent, gNB can indicate in a PDSCH transmission that a PUSCH has been successfully received and terminate any remaining random access procedure messages.

In another example 2.1.9.3, if the UE receives acknowledgment (e.g., HARQ-ACK) for the PUSCH transmission before the completion of the random access procedure, the UE terminates the remaining messages of the random access procedure.

In another instance, the traditional sequence of signaling is preserved regardless of the PUSCH traffic reception status. Multiple PUSCH and PDSCH transmissions can occur during the random access procedure.

Figure 15A:
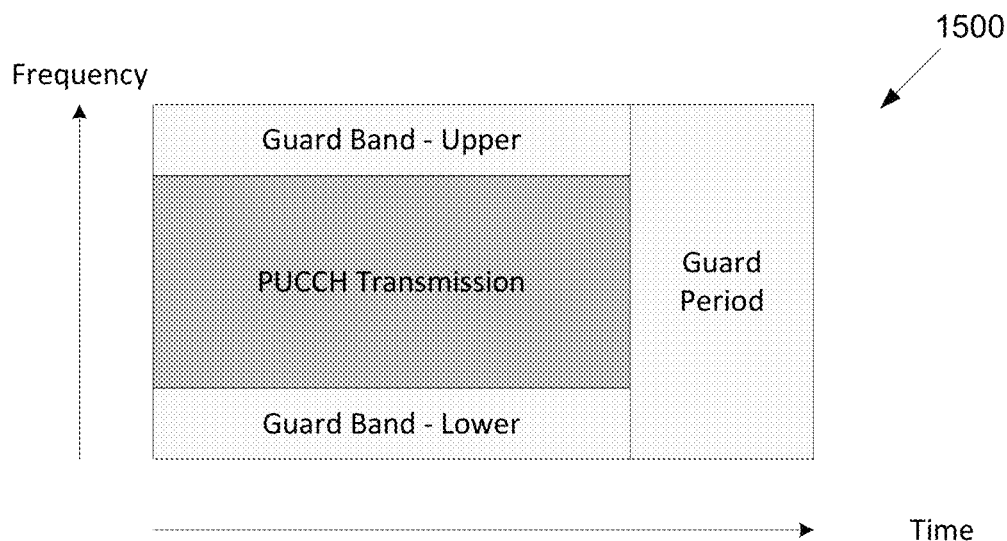
FIGS. 15A-15C illustrate example guard periods for PUCCH according to embodiments of the present disclosure.
Figure 15B:
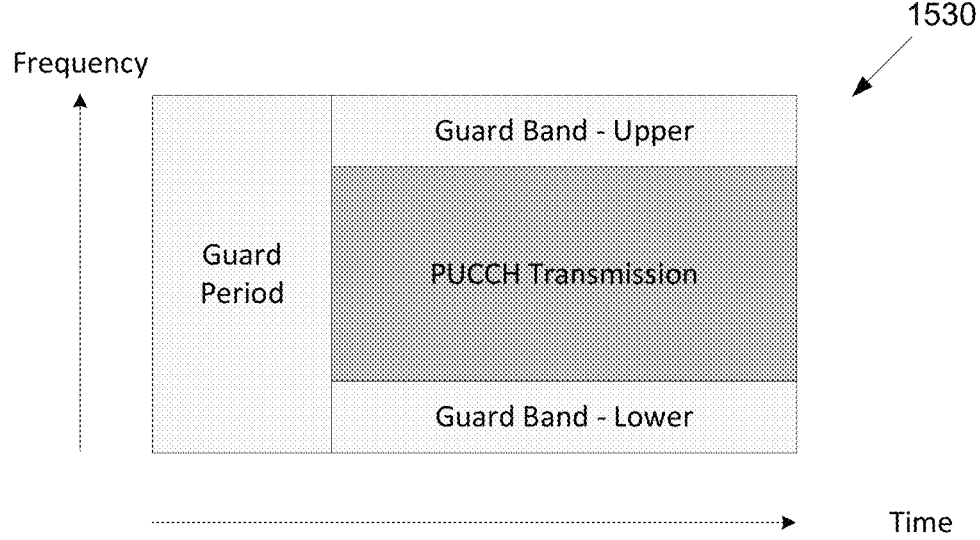
Figure 15C:
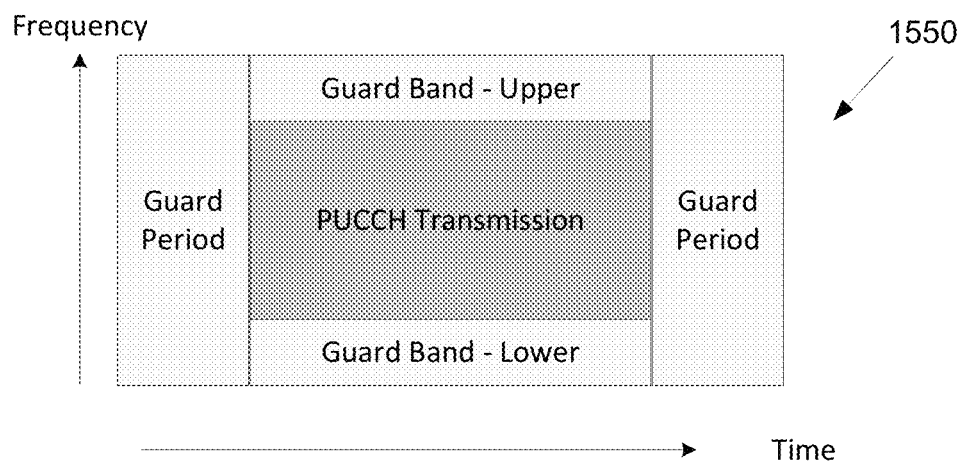

FIGS. 15A-15C illustrate example guard periods and guard bands for PUCCH 1500, 1530, and 1550 according to embodiments of the present disclosure. The embodiments of the guard periods and guard bands for PUCCH 1500, 1530, and 1550 shown in FIGS. 15A-15C are for illustration only.

In one example 2.2, a UE is independently configured to transmit PUCCH (e.g., in response to downlink transmission) and trigger a RACH procedure (either Type-1 random access procedure or Type-2 random access procedure).

In such example, PUCCH can have a guard period and guard band as TA is unknown, or has an estimation error, before completion of RACH procedure as illustrated in FIG. 15. The guard period can be in number of OFDM symbols and/or in number of slots. The guard band can be in number of PRBs and/or in number of sub-carriers. The guard band can be on one side of the transmission or on both sides as illustrated in FIGS. 15A-15C.

In such examples, the size of the guard period and/or the size of the guard band can be specified in system specifications and/or configured or update by higher layer RRC signaling and/or MAC CE signaling and/or L1 control signaling.

In such examples, the size of the guard period and/or the size of the guard band can be specified in system specifications and/or configured or updated by higher layer RRC signaling and/or MAC CE signaling and/or L1 control signaling, and the presence or absence of the guard period and/or guard band can be configured or updated by higher layer RRC signaling and/or MAC CE signaling and/or L1 control signaling.

The presence of a guard band and/or a guard period is due to a timing error in the UL transmission time the UE determines or estimates for the transmission of the PUCCH channel. If the timing error exceeds the CP window (e.g. as illustrated in FIG. 7 for user 2 and user 3), the UL PUCCH channel can interfere with other users at the base station receiver. To mitigate these effects a guard band and/or a guard period is inserted (there is no signal transmitted in the guard band and the guard period).

The guard period, which can also be referred to as the guard time, can be after the PUCCH transmission as illustrated in FIG. 15A or before the PUCCH transmission as illustrated in FIG. 15B or split before and after the PUCCH transmission as illustrated in FIG. 15C.

The PUCCH transmissions and RACH procedure messages are independent.

In one example 2.2.1, PUCCH is transmitted before MsgA preamble (2-step RACH) or Msg1 (4-step RACH).

In another example 2.2.2, PUCCH is transmitted at the same time (slot) as MsgA preamble or Msg1. In one example 2.2.2.1, PUCCH and MsgA preamble or Msg1 proceed in parallel (in different PRBs). In another example 2.2.2.2, PUCCH transmission is dropped and MsgA preamble or Msg1 proceeds. In another example 2.2.2.3, MsgA preamble or Msg1 is dropped and the PUCCH transmission proceeds.

In another example 2.2.3, PUCCH is transmitted between MsgA preamble and MsgA PUSCH or between Msg1 and Msg3 or a PUSCH scheduled by a RAR UL grant.

In another example 2.2.4, PUCCH is transmitted at the same time or overlaps with MsgA PUSCH or Msg3 or a PUSCH scheduled by a RAR UL grant. In one example 2.2.4.1, PUCCH and MsgA PUSCH or Msg3 or a PUSCH scheduled by a RAR UL grant proceed in parallel (in different PRBs). In another example 2.2.4.2, PUCCH transmission is dropped and MsgA PUSCH or Msg3 or a PUSCH scheduled by a RAR UL grant proceeds. In another example 2.2.4.3, MsgA PUSCH or Msg3 or a PUSCH scheduled by a RAR UL grant is dropped and the PUCCH transmission proceeds. In another example 2.2.4.4, the PUCCH message is multiplexed into MsgA PUSCH or Msg3 or a PUSCH scheduled by a RAR UL grant.

In another example 2.2.5, PUCCH is transmitted after MsgA PUSCH or Msg3 or a PUSCH scheduled by a RAR UL grant.

In another example 2.2.6, if the PUCCH is successfully received at gNB, the RACH procedure, or remaining RACH messages are canceled.

In one example 2.2.6.1, if PUCCH is successfully received before RAR message, gNB can indicate in the RAR that a PUCCH has been successfully received and terminate the random access procedure.

In another example 2.2.6.2, if a PUCCH is successfully received after the RAR message has been sent, gNB can indicate in a PDSCH transmission that a PUCCH has been successfully received and terminate any remaining random access procedure messages.

In one example 2.3, A UE is independently configured to transmit SRS and trigger a RACH procedure (either Type-1 random access procedure or Type-2 random access procedure).

Figure 16A:
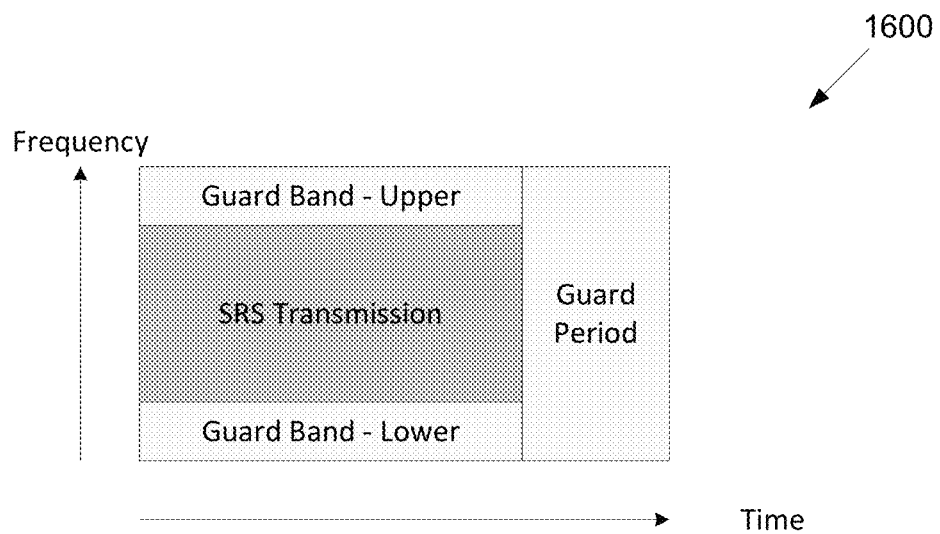
FIGS. 16A-16C illustrate example guard periods for SRS according to embodiments of the present disclosure.
Figure 16B:
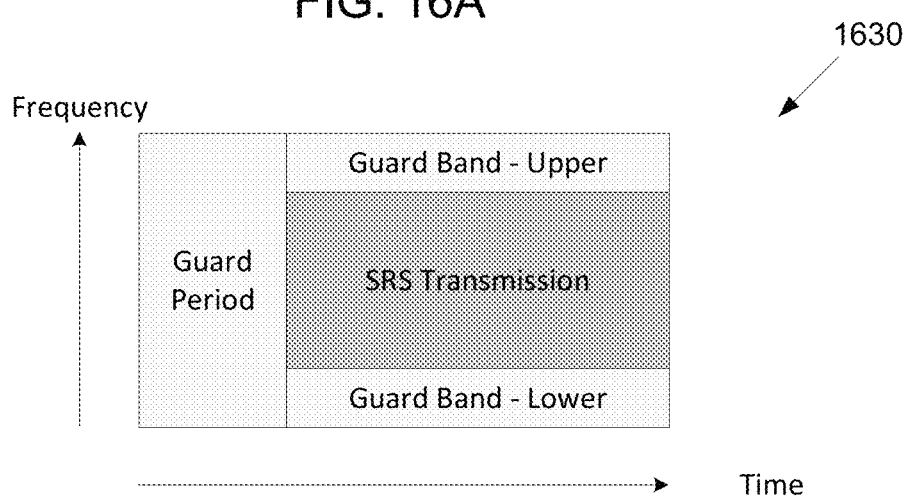
Figure 16C:
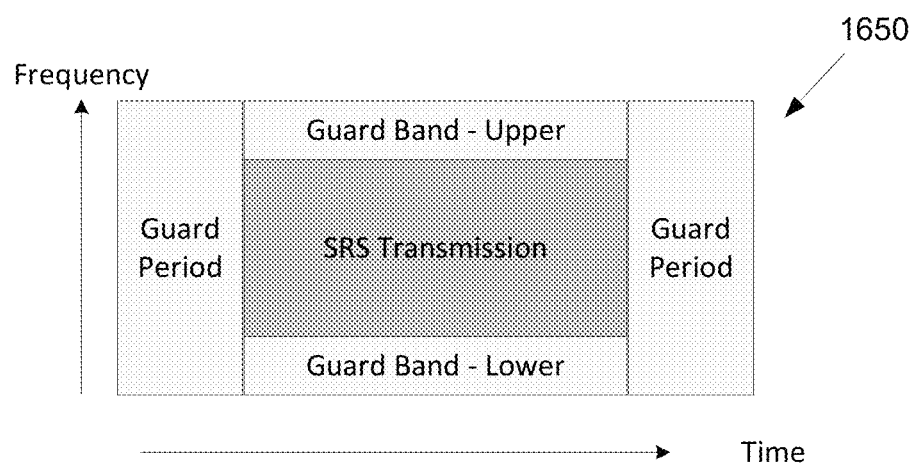

FIGS. 16A-16C illustrate example guard periods and guard bands for SRS 1600, 1630, and 1650 according to embodiments of the present disclosure. The embodiments of the guard periods and guard bands for SRS 1600, 1630, and 1650 shown in FIGS. 16A-16C are for illustration only.

SRS can have a guard period and guard band as TA is unknown, or has an estimation error, before completion of RACH procedure as illustrated in FIGS. 16A-16C. The guard period can be in number of OFDM symbols and/or in number of slots. The guard band can be in number of PRBs and/or in number of sub-carriers. The guard band can be on one side of the transmission or on both sides as illustrated in FIGS. 16A-16C.

In some examples, the size of the guard period and/or the size of the guard band can be specified in system specifications and/or configured or update by higher layer RRC signaling and/or MAC CE signaling and/or L1 control signaling.

In some examples, the size of the guard period and/or the size of the guard band can be specified in system specifications and/or configured or updated by higher layer RRC signaling and/or MAC CE signaling and/or L1 control signaling, and the presence or absence of the guard period and/or guard band can be configured or updated by higher layer RRC signaling and/or MAC CE signaling and/or L1 control signaling.

The presence of a guard band and/or a guard period is due to a timing error in the UL transmission time the UE determines or estimates for the transmission of the SRS signal. If the timing error exceeds the CP window (e.g. as illustrated in FIG. 7 for user 2 and user 3), the UL SRS signal can interfere with other users at the base station receiver. To mitigate these effects a guard band and/or a guard period is inserted (there is no signal transmitted in the guard band and the guard period).

The guard period, which can also be referred to as the guard time, can be after the SRS transmission as illustrated in FIG. 16A or before the SRS transmission as illustrated in FIG. 16B or split before and after the SRS transmission as illustrated in FIG. 16C.

The SRS transmissions and RACH procedure messages are independent.

In one example 2.3.1, SRS is transmitted before MsgA preamble (2-step RACH) or Msg1 (4-step RACH)

In another example 2.3.2, SRS is transmitted at the same time (slot) as MsgA preamble or Msg1.

In one example 2.3.2.1, SRS and MsgA preamble or Msg1 proceed in parallel (in different PRBs).

In another example 2.3.2.2, SRS transmission is dropped and MsgA preamble or Msg1 proceeds.

In another example 2.3.2.3, MsgA preamble or Msg1 is dropped and the SRS transmission proceeds.

In another example 2.3.3, SRS is transmitted between MsgA preamble and MsgA PUSCH or between Msg1 and Msg3 or a PUSCH scheduled by a RAR UL grant.

In another example 2.3.4, SRS is transmitted at the same time or overlaps with MsgA PUSCH or Msg3 or a PUSCH scheduled by a RAR UL grant.

In one example 2.3.4.1, SRS and MsgA PUSCH or Msg3 or a PUSCH scheduled by a RAR UL grant proceed in parallel (in different PRBs).

In another example 2.3.4.2, SRS transmission is dropped and MsgA PUSCH or Msg3 or a PUSCH scheduled by a RAR UL grant proceeds.

In another example 2.3.4.3, MsgA PUSCH or Msg3 or a PUSCH scheduled by a RAR UL grant is dropped and the SRS transmission proceeds.

In another example 2.3.4.4, the SRS is multiplexed into MsgA PUSCH or Msg3 or a PUSCH scheduled by a RAR UL grant.

In another example 2.3.5, SRS is transmitted after MsgA PUSCH or Msg3 or a PUSCH scheduled by a RAR UL grant.

In another example 2.3.6, if the SRS is successfully received at gNB, the RACH procedure, or remaining RACH messages are canceled.

In one example 2.3.6.1, if SRS is successfully received before RAR message, gNB can indicate in the RAR that a SRS has been successfully received and terminate the random access procedure.

In another example 2.3.6.2, if SRS is successfully received after the RAR message has been sent, gNB can indicate in a PDSCH transmission that a SRS has been successfully received and terminate any remaining random access procedure messages.

The random access procedure can be contention free random access (CFRA) or contention based random access (CBRA).

In aforementioned embodiments/examples, the Type-1 random access procedure can also refer to an equivalent terminology, such as 4-step random access procedure, and the Type-2 ransom access procedure can also refer to an equivalent terminology, such as 2-step random access procedure.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
  receive configuration information for a first and a second reference signal (RS), and
  receive the first RS from a first base station (BS) and the second RS from a second BS; and
a processor operably connected to the transceiver, the processor configured to:
  measure a time of arrival of the second RS relative to a time of arrival of the first RS,
  determine a differential propagation delay between the first RS and the second RS based on the times of arrival, and
  determine a transmission time for an uplink (UL) UE-dedicated channel to the second BS based on the differential propagation delay,
wherein the transceiver is further configured to:
  transmit, to the second BS, a physical random access channel (PRACH) associated with a random access channel (RACH) procedure, and
  transmit the UL UE-dedicated channel to the second BS based on the determined transmission time before receiving a timing advance (TA) command associated with the PRACH transmission.

2. The UE of claim 1, wherein:
a difference between a reference time of the first BS ($T_{RefA}$) and a reference time of the second BS ($T_{RefB}$) ($\Delta_{RefAB} = T_{RefA} - T_{RefB}$) is indicated to the UE, and
the determination of the differential propagation delay and the determination of the UL transmission time is further based on $\Delta_{RefAB}$.

3. The UE of claim 2, wherein $\Delta_{RefAB}$ is updated by L2 or L1 control signaling.

4. The UE of claim 1, wherein the RACH procedure is terminated based on an indication of successful reception of the UL UE-dedicated channel.

5. The UE of claim 1, wherein:
the transceiver is further configured to use a guard band for the UL UE-dedicated channel transmission, and
the guard band is around the UL UE-dedicated channel transmission and based on a timing error of the determined transmission time.

6. The UE of claim 1, wherein:
the transceiver is further configured to use a guard period for the UL UE-dedicated channel transmission, and
the guard period is around the UL UE-dedicated channel transmission and based on a timing error of the determined transmission time.

7. A method of operating a user equipment (UE), the method comprising:
receiving configuration information for a first and a second reference signal (RS);
receiving the first RS from a first base station (BS) and the second RS from a second BS;
measuring a time of arrival of the second RS relative to a time of arrival of the first RS;
determining a differential propagation delay between the first RS and the second RS based on the times of arrival;
determining a transmission time for an uplink (UL) UE-dedicated channel to the second BS based on the differential propagation delay;
transmitting, to the second BS, a physical random access channel (PRACH) associated with a random access channel (RACH) procedure; and
transmitting the UL UE-dedicated channel to the second BS based on the determined transmission time before receiving a timing advance (TA) command associated with the PRACH transmission.

8. The method of claim 7, wherein:
a difference between a reference time of the first BS ($T_{RefA}$) and a reference time of the second BS ($T_{RefB}$) ($\Delta_{RefAB}=T_{RefA}-T_{RefB}$) is indicated to the UE, and
the determination of the differential propagation delay and the determination of the UL transmission time is further based on $\Delta_{RefAB}$.

9. The method of claim 7, wherein $\Delta_{RefAB}$ is updated by L2 or L1 control signaling.

10. The method of claim 7, wherein the RACH procedure is terminated based on an indication of successful reception of the UL UE-dedicated channel.

11. The method UE of claim 7, wherein:
transmitting the UL UE-dedicated channel further comprises using a guard band for the UL UE-dedicated channel transmission, and
the guard band is based on a timing error of the determined transmission time.

12. The method of claim 7, wherein:
transmitting the UL UE-dedicated channel further comprises using a guard period for the UL UE-dedicated channel transmission, and
the guard period is based on a timing error of the determined transmission time.

* * * * *